US006416451B1

(12) United States Patent
Ratzel et al.

(10) Patent No.: US 6,416,451 B1
(45) Date of Patent: Jul. 9, 2002

(54) OUTPUT CHUTE FOR CUSHIONING CONVERSION MACHINE

(75) Inventors: Richard O. Ratzel, Westlake; Joseph J. Harding, Mentor, both of OH (US); Dirk Johannes Siekmann, Telford (GB); Edward W. Lintala, Concord, OH (US)

(73) Assignee: Ranpak Corp., Concord Township, OH (US)

(*) Notice: Subject to any disclaimer, the term of this patent is extended or adjusted under 35 U.S.C. 154(b) by 526 days.

(21) Appl. No.: 09/217,696

(22) Filed: Dec. 21, 1998

Related U.S. Application Data

(63) Continuation of application No. PCT/US97/11515, filed on Jun. 30, 1997, and a continuation of application No. 08/673,307, filed on Jun. 28, 1996.

(51) Int. Cl.[7] .......................... B31B 49/00; B31B 1/00; B65D 91/00; B65G 11/04

(52) U.S. Cl. ......................... 493/38; 493/464; 493/967; 232/43.1; 232/44

(58) Field of Search ................................ 493/404, 967, 493/38; 53/389.3; 83/397, 397.1, 398, 860; 232/44, 43.1, 43.4; 193/DIG. 2; 221/191–196

(56) References Cited

U.S. PATENT DOCUMENTS

| | | | | |
|---|---|---|---|---|
| 3,155,314 A | * | 11/1964 | Kreider | 232/44 |
| 3,641,841 A | * | 2/1972 | Komori | 74/615 |
| 3,888,148 A | | 6/1975 | Weissman | 83/100 |
| 3,977,668 A | | 8/1976 | Bologna et al. | 271/126 |
| 4,026,198 A | * | 5/1977 | Ottaviano | 493/38 |
| 4,040,336 A | | 8/1977 | Lewis et al. | |
| 4,074,602 A | | 2/1978 | Brower | 83/471.2 |
| 4,085,303 A | | 4/1978 | McIntyre et al. | 200/61.41 |
| 4,088,856 A | | 5/1978 | Tebben | 200/52 R |
| 4,123,959 A | | 11/1978 | Schill | 83/874 |
| 4,306,439 A | | 12/1981 | Miller | 72/199 |
| 4,318,324 A | | 3/1982 | Hall | 83/897 |
| 4,424,741 A | | 1/1984 | Moldestad | 100/53 |
| 4,462,287 A | | 7/1984 | Weis et al. | 83/104 |
| 4,524,657 A | | 6/1985 | Griffith | 83/69 |
| 4,528,488 A | | 7/1985 | Susemihl | 318/382 |
| 4,536,144 A | | 8/1985 | Hehl | 425/154 |
| 4,554,806 A | | 11/1985 | Hewins | 68/257 |

(List continued on next page.)

FOREIGN PATENT DOCUMENTS

| | | |
|---|---|---|
| DE | 3421216 | 6/1985 |
| DE | 4424381 | 1/1996 |
| DE | 19512716 | 1/1996 |
| EP | 0523382 | 6/1992 |
| EP | 0650827 | 5/1995 |
| EP | 0688664 | 12/1995 |
| EP | 0779148 | 6/1997 |
| FR | 2624830 | 6/1989 |
| WO | WO91/06694 | 5/1991 |
| WO | WO95/13914 | 5/1995 |
| WO | WO95/14569 | 6/1995 |
| WO | WO95/28276 | 10/1995 |
| WO | WO96/03273 | 2/1996 |
| WO | WO96/35576 | 11/1996 |
| WO | WO97/02183 | 1/1997 |

*Primary Examiner*—Brian L. Johnson
*Assistant Examiner*—Matthew Luby
(74) *Attorney, Agent, or Firm*—Renner, Otto, Boisselle & Sklar, LLP

(57) ABSTRACT

A safety output chute for a cushioning conversion machine includes a chute having an input end and an output end, the input end including an opening for receiving a flexible cushioning product from an outlet of the cushioning conversion machine; and a plurality of rollers situated inside the chute, the rollers being oriented such that the flexible cushioning product must follow a non-linear path from the input end of the chute to the output end of the chute. Other embodiments of a safety output chute are also disclosed.

13 Claims, 27 Drawing Sheets

U.S. PATENT DOCUMENTS

| | | | | | |
|---|---|---|---|---|---|
| 4,555,105 | A | | 11/1985 | Wyatt | 271/264 |
| 4,699,031 | A | | 10/1987 | D'Angelo et al. | 83/23 |
| 4,699,609 | A | | 10/1987 | Komaransky et al. | 493/357 |
| 4,761,901 | A | | 8/1988 | Szafarz | 37/262 |
| 4,787,544 | A | | 11/1988 | Jones | 226/118 |
| 4,968,291 | A | | 11/1990 | Baldacci et al. | 493/354 |
| 4,976,600 | A | | 12/1990 | Willett | 425/151 |
| 5,044,270 | A | | 9/1991 | Schwelling | |
| 5,076,555 | A | | 12/1991 | Bunch, Jr. | 270/39 |
| 5,088,972 | A | * | 2/1992 | Parker | 493/352 |
| 5,123,889 | A | | 6/1992 | Armington et al. | 493/352 |
| 5,241,885 | A | | 9/1993 | Kuchler | 83/76.7 |
| 5,292,238 | A | | 3/1994 | Michalak | 425/9 |
| 5,322,477 | A | | 6/1994 | Armington et al. | 493/346 |
| 5,427,020 | A | | 6/1995 | Conrad et al. | 100/53 |
| 5,435,218 | A | | 7/1995 | Martin | 83/176 |
| 5,442,983 | A | | 8/1995 | D'Angelo et al. | 83/56 |
| 5,538,490 | A | | 7/1996 | Taniwa | 493/27 |
| 5,542,232 | A | | 8/1996 | Beierlorzer | 53/117 |
| 5,709,642 | A | | 1/1998 | Ratzel et al. | 493/375 |
| 5,785,639 | A | | 7/1998 | Simmons | 493/364 |
| 5,806,759 | A | * | 9/1998 | Axisa | 232/44 |
| 5,816,995 | A | | 10/1998 | Tekavec | 493/352 |
| 5,823,936 | A | | 10/1998 | Ratzel | 493/464 |

* cited by examiner

OUTPUT CHUTE FOR CUSHIONING CONVERSION MACHINE

RELATED APPLICATIONS

This application is a continuation of International Application No. PCT/US97/11515, filed Jun. 30, 1997, and U.S. patent application Ser. No. 08/673,307, filed Jun. 28, 1996.

TECHNICAL FIELD

This invention relates generally to a safety device and, more particularly, to a safety device for protecting the hands of an operator of a cushion conversion machine during a cutting operation.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to perform adequately as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alternative. Paper is biodegradable, recyclable and renewable, making it an environmentally responsible choice for conscientious industries. Furthermore, paper protective dunnage material is particularly advantageous for use with particle-sensitive merchandise, as its clean, dust-free surface is resistant to electrostatic buildup.

While paper in sheet form could possibly be used as a protective packaging material, it is usually preferable to convert the sheets of paper into a pad-like or other relatively low density dunnage product. This conversion may be accomplished by a cushioning conversion machine, such as those disclosed in commonly assigned U.S. Pat. Nos. 4,968,291 and 5,123,889. The therein disclosed cushioning conversion machines convert sheet-like stock material, such as paper in multi-ply form, into a pad-like dunnage product having longitudinally extending pillow-like portions that are connected together along a stitched central portion of the product. The stock material preferably consists of two or three superimposed webs or layers of biodegradable, recyclable and reusable thirty-pound Kraft paper or the like rolled onto a hollow cylindrical tube. A thirty-inch wide roll of this paper, which is approximately 450 feet long, will weigh about 35 pounds and will provide cushioning equal to approximately four fifteen cubic foot bags of plastic foam peanuts while at the same time requiring less than one-thirtieth the storage space.

Specifically, these machines convert the stock material into a continuous strip having lateral pillow-like portions separated by a thin central band. This strip is connected or coined along the central band to form a coined strip which is severed or cut into sections of a desired length. The cut sections each include lateral pillow-like portions separated by a thin central band and provide an excellent relatively low density pad-like product which may be used in place of conventional plastic protective packaging material.

As a result of the thickness of the strip produced by a cushioning conversion machine, such as those described above, the severing or cutting action must often be quite forceful, for example, employing a heavy and relatively sharp, driven blade or blade surfaces to adequately cut the strip into sections of the desired length. The timing and frequency of the cuts is often variable and often the end product emanates from the cushion conversion machine at a fairly rapid rate. This, coupled with the additional fact that the paper may sometimes become jammed in the cutting mechanism and output of the machine, make the cutting mechanism and operation an area of safety concern for a cushioning conversion machine.

While many present cushioning conversion machines include a plurality of safety features to protect the hands of an operator during a cutting operation, such as, for example, the use of multiple, spaced anti-tie down switches, electrical interlocks, etc., it is always desirable to provide cushion conversion machines with even additional or substitute safety devices to further assure operator safety.

SUMMARY OF THE INVENTION

The present invention provides for improved safety when using cushion conversion machines. Such improved safety is achieved by preventing an operator's body parts (generally fingers, hands and arms) from coming into contact with the moving cutting blade or blades of a cushioning conversion machine as the operator collects the output from the machine.

In accordance with one aspect of the present invention, a safety output chute for a cushioning conversion machine includes a chute having an input end and an output end, the input end including an opening for receiving a flexible cushioning product from an outlet of the cushioning conversion machine and a plurality of rollers situated inside the chute, the rollers being oriented such that the flexible cushioning product must follow a non-linear path from the input end of the chute to the output end of the chute to inhibit access to the input end of the chute from the output end thereof.

In accordance with another aspect of the invention, a safety output chute for a cushioning conversion machine includes a chute having an input end and an output end, the input end including an opening for receiving a cushioning product from an outlet of the cushioning conversion machine, and a rotating assembly disposed within the chute including a plurality of radially extending vanes for contacting the cushioning product and rotating to permit movement of the cushioning product through the chute while inhibiting access to the input end of the chute from the output end thereof.

In accordance with yet another aspect of the invention, a safety output chute for a cushioning conversion machine includes a chute having an input end and an output end, the input end including an opening for receiving a cushioning product from an outlet of the cushioning conversion machine, and a sensor for sensing the presence of a foreign object in the output chute and generating a signal for communication to the cushioning conversion machine in accordance with such sensing.

In accordance with a further aspect of the invention, a safety output chute for a cushioning conversion machine includes a chute having an input end and an output end, the input end including an opening for receiving a cushioning product from an outlet of the cushioning conversion machine, a shield disposed within the chute having an open position and a closed position, an actuator mechanism for moving the shield between open and closed positions, and a switch for detecting whether the shield is in the open or closed position or an improper position indicating the presence of a foreign object in the chute in addition to the cushioning product.

In accordance with a still further aspect of the invention, a safety output chute for a cushioning conversion machine includes a chute having an input end including an opening for receiving a cushioning product from an outlet of the cushioning conversion machine, the chute including a hinged cover, and a sliding door for selectively blocking the opening when the cover is open and permitting passage through the opening when the cover is closed.

In accordance with an even further aspect of the invention, a safety output chute for a cushioning conversion machine includes a chute having an input end and an output end, the input end including an opening for receiving a flexible cushioning product from an outlet of the cushioning conversion machine; and a plurality of axially spaced hinged elements substantially preventing ingress though the chute from the output end towards the input end.

In accordance with another aspect of the invention, a safety output chute for a cushioning conversion machine includes a chute having an input end and an output end, the input end including an opening for receiving a cushioning product from an outlet of the cushioning conversion machine; a shield partially within the chute having an open position and a closed position, the chute extending outside of the chute to contact and to deflect the cushioning product outside of the chute when in the closed position; and an actuating mechanism for moving the shield between the open and closed positions.

In accordance with still another aspect of the invention, a safety output chute for a cushioning conversion machine includes a chute having an input end and an output end, the input end including an opening for receiving a cushioning product from an outlet of the cushioning conversion machine, a shield disposed within the chute having an open position and a closed position, the shield adapted to contact the cushioning product generally along a reduced portion of its surface when in a closed position, and an actuating mechanism for moving the shield between the open and closed positions. The aforementioned features and other aspects of the present invention are described in more detail in the detailed description and the accompanying drawings which follow.

DETAILED DESCRIPTION OF THE INVENTION

Figure 1:
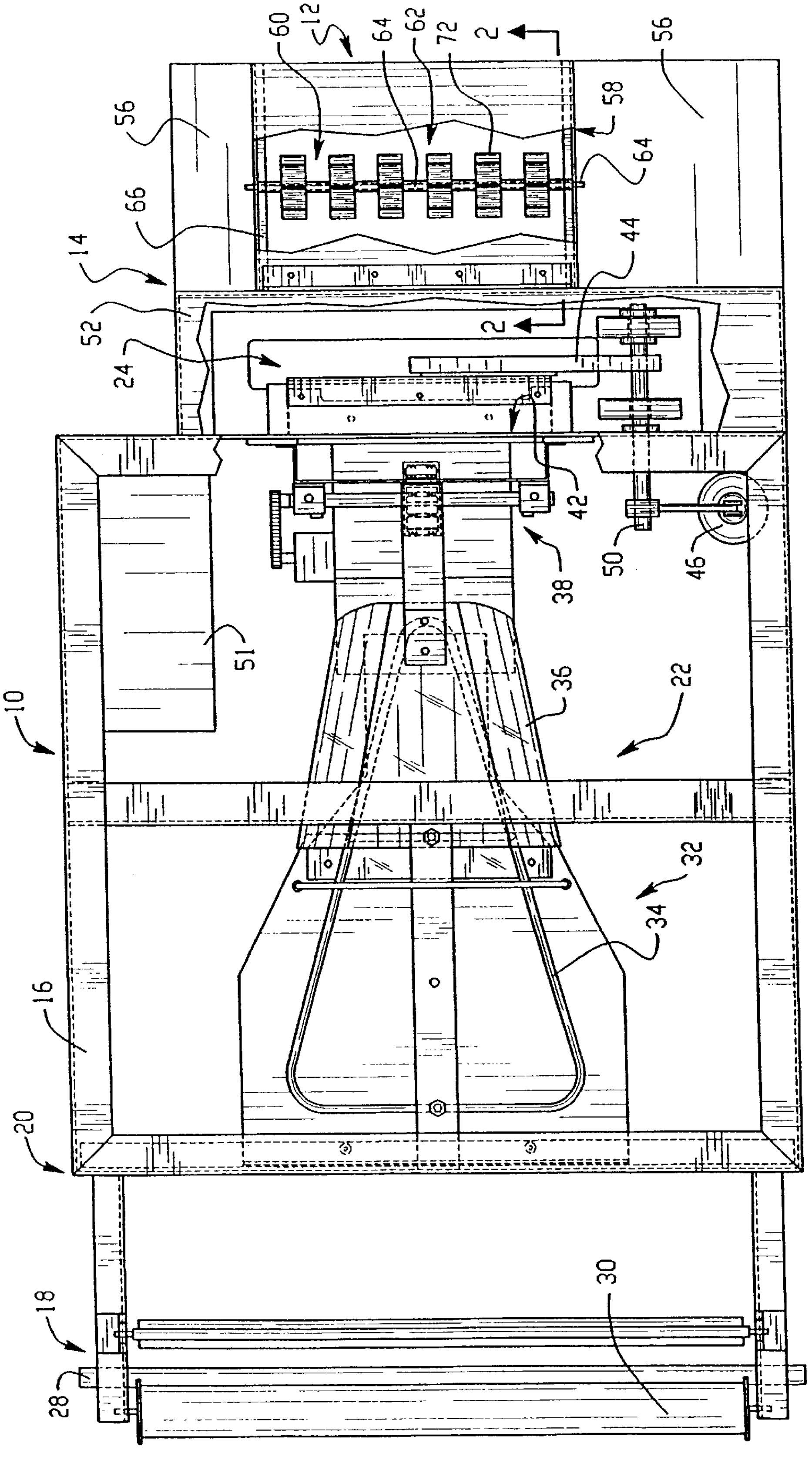
FIG. 1 is a top view of a cushioning conversion machine including a safety output chute including a rotating vane assembly in accordance with one embodiment of the present invention.
Figure 2:
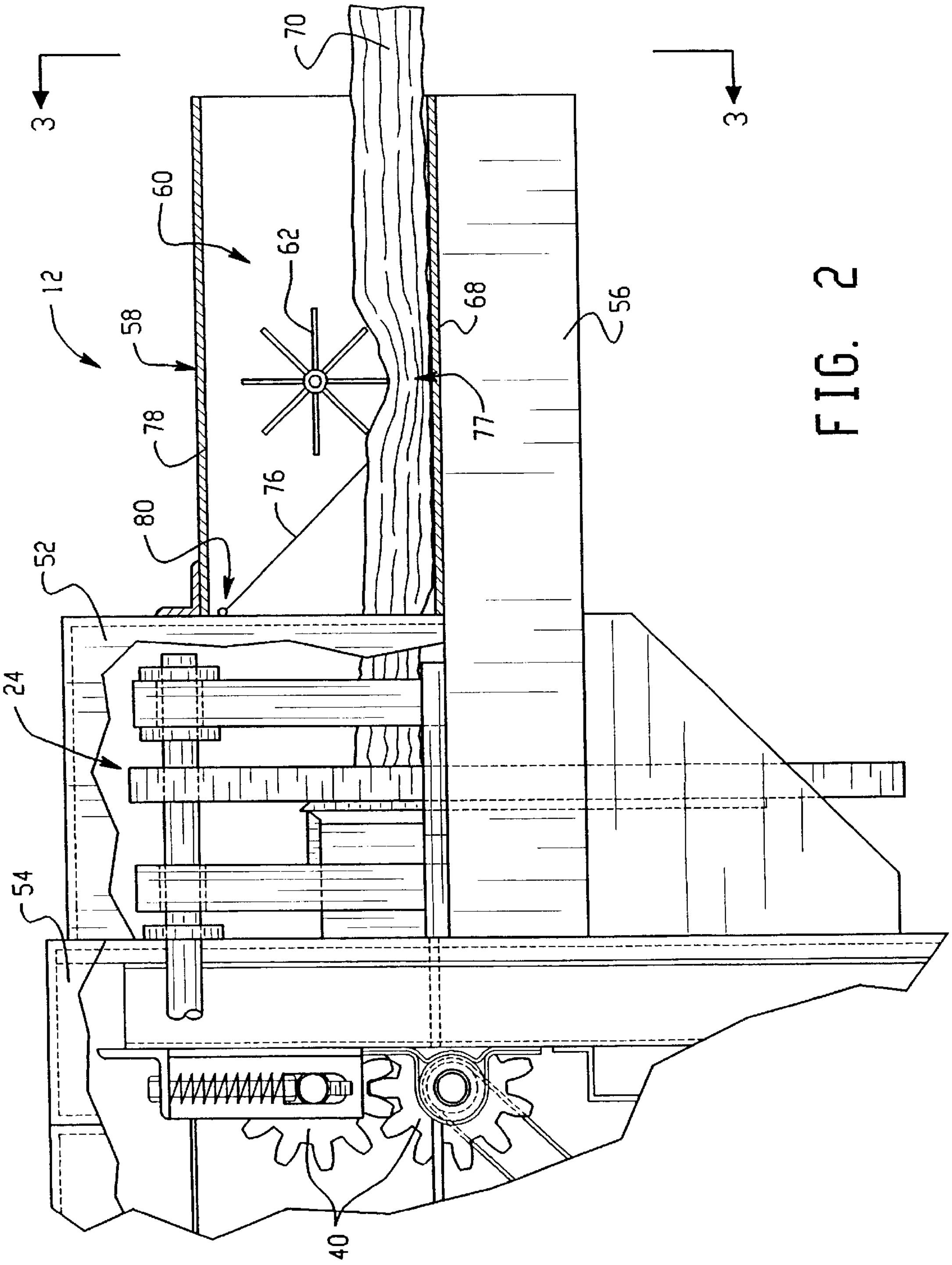
FIG. 2 is a partial side elevational of the cushioning conversion machine and the safety output chute of FIG. 1.

Referring now to the drawings in detail and initially to FIGS. 1 and 2, there is shown a cushioning conversion machine 10 for creating low density cushioning pads including a safety output chute 12 located at the downstream end 14 of the machine for providing the pads formed by the cushioning machine to an operator in a safe and effective manner.

The machine 10 includes a frame 16 to which are mounted a supply assembly 18 at the upstream end 20 of the frame for supplying stock material to be converted into a cushioning product, a conversion assembly 22 for converting the stock material into a continuous strip of cushioning product and a severing or cutting assembly 24 located generally between the conversion assembly and the safety output chute 12 at the downstream end 14 of the frame for severing the strip into cushioning pads of the desired length. (The terms "upstream" and "downstream" in this context are characteristic of the direction of flow of the stock material through the machine 10.)

The stock supply assembly 18 preferably includes a shaft or axle 28 for supporting a roll of sheet like stock material (not shown) and a number of rollers 30 for providing the stock material to the conversion assembly 22. The stock material may consist of three superimposed webs of biodegradable, recyclable and reusable thirty-pound Kraft paper or the like rolled onto a hollow cylindrical tube. The conversion assembly 22 includes a forming assembly 32, such as a cooperating three-dimensional wire former 34 and converging chute 36 as is shown in FIG. 1, and a feed assembly 38 including a pair of gears 40 for pulling the stock material through the forming assembly and feeding it through an outlet 42 to the severing or cutting assembly 24 and the safety chute 12. The cutting assembly 24 is positioned adjacent the machine outlet 42 and may include one or more blades 44 or other means acting to sever the continuous strip of padding emerging from the outlet at the appropriate times. The cutting assembly 24 further includes a motor, air cylinder or solenoid 46 powering the blade 44 or other severing means through a shaft linkage assembly 50. The area of the cutting operation is confined within an enclosure 52 mounted to an upstanding frame portion 54 including the machine outlet 42 and supported upon a frame extension 56.

Control of the cushioning conversion machine 10 in general and of the conversion assembly 22 and cutting assembly 24 in particular is preferably accomplished and coordinated through the use of a process controller (shown schematically at 51) as described more fully in copending U.S. patent application Ser. No. 08/279,149 which is incorporated herein in its entirety by this reference. The process controller 51 may communicate with the various elements and assemblies of the cushioning conversion machine 10 and peripheral components through a variety of conventional manners as would be understood by a person of skill in the art and such interconnections are thus not specifically illustrated in the drawing figures. A further description of the exemplary cushioning conversion machine 10 can be found in U.S. Pat. No. 4,699,609, which is incorporated herein in its entirety by this reference.

During operation of the machine 10, the stock supply assembly 18 supplies the stock material to the forming assembly 32. The frame structure 34 and conical chute 36 of the forming assembly 32 causes inward rolling of the lateral edges of the sheet-like stock material to form the lateral pillow-like portions of the continuous strip. The gears 40 of the feed assembly 38 pull the stock material downstream through the machine and also coin the central band of the continuous strip to form the coined strip. As the coined strip travels downstream from the feed assembly 38, the cutting assembly 24 cuts the strip into pads of a desired length which then travel through the safety output chute 12 for collection by an operator.

Figure 3:
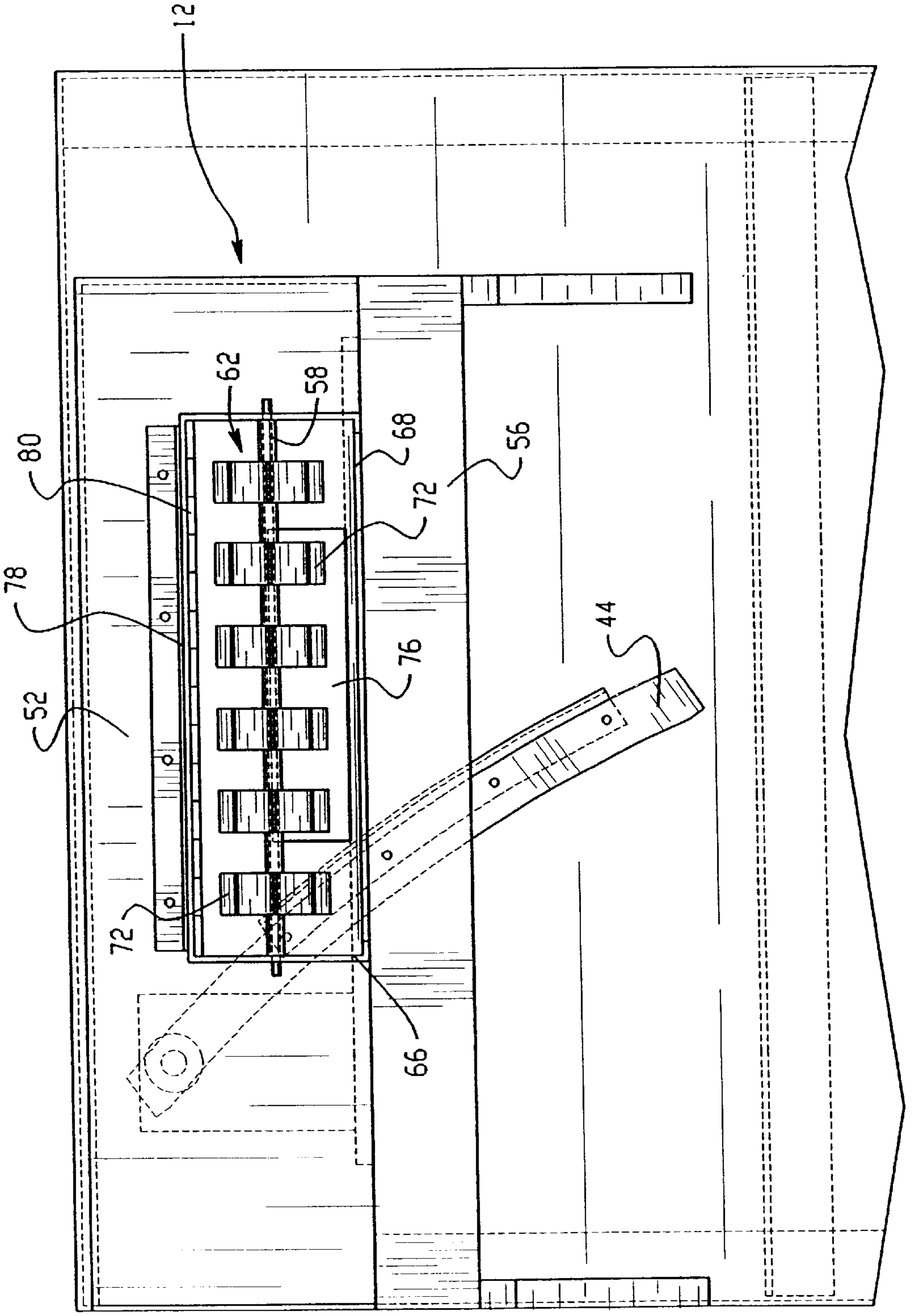
FIG. 3 is front elevational view of the safety output chute looking into the opening of the chute.

The safety output chute 12, with additional reference to FIGS. 2 and 3, is defined by housing 58, generally rectangular in cross-section, open to receive a pad as it passes through the cutting assembly 24 and extending away from the cutting assembly in a downstream direction. The housing 58 is connected to the cutting assembly enclosure 52 and is supported by the frame extension 56. Disposed within the housing 58 is a rotatable, multivaned assembly 60 formed of a number of vanes or blades 62 extending radially from a shaft 64 which traverses laterally the rectangular chute defined within the housing 58. The shaft 64 is rotatably mounted to opposed sidewalls 66 of the housing 58 and is spaced from the bottom wall 68 in order to accommodate a pad 70 in a somewhat compressed condition between the vane 62 and bottom wall 68.

Figure 4:
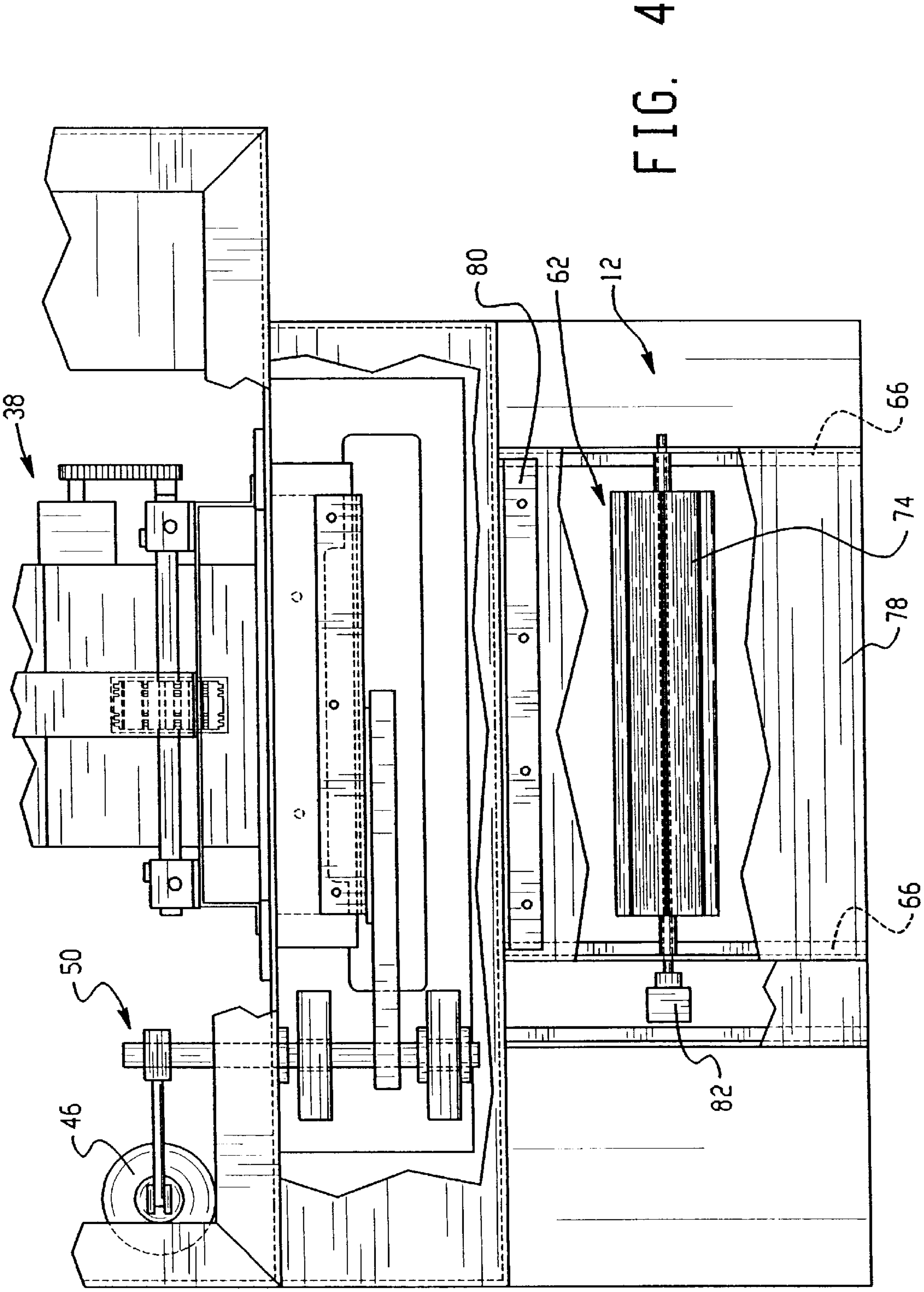
FIG. 4 is a partial top view of an alternate embodiment of the rotating vane assembly including axially continuous vanes.

The vane 62 may be discontinuous axially along the shaft 64 in the form of discreet, spaced vane portion 72, as shown in FIGS. 1 and 3, or as axially continuous vanes 74, as is shown in FIG. 4. Also disposed within the housing 58 between the cutting assembly enclosure 52 and the vane assembly 60 is a deflector panel 76 extending from the upper, upstream portion of the housing downwardly and downstream to the space 77 (FIG. 4) between the vane assembly 60 and the bottom wall 68 to direct a pad between the bottom wall and the vane assembly. The deflector panel 76 is preferably mounted at its upper distal end to the top wall 78 by a hinge 80 and biased downwardly. In operation, a pad 70 emerging through the cutting assembly 24 and progressing through the safety output chute 12 will be directed under the vane assembly 62 by the deflector panel 76, with the emanating pad thus turning the vane assembly as the pad is forced through the safety output chute. Consequently, the pad 70 can be directed through the safety output chute 12 to an operator while preventing the ingress of a hand past the vane assembly 62. The pad is preferably compressed by the vane assembly 60 to a thickness such that access is limited toward the cutting assembly 24, yet which still allows the pad to resiliently expand to substantially its original uncompressed size. The space 77 between the vane assembly 60 and the bottom wall 68 and the distance from the space to the cutting assembly 24 is preferably correlated such that access to the cutting assembly is limited by the combined effects of the narrow space 77 and its distance to the cutting assembly located upstream thereof.

In some embodiments, the shaft 64 may extend through an end wall 66 of the housing 58 for connection to a knob 82, as is shown in FIG. 4, to permit the manual rotation of the vane assembly. This permits an operator to urge a pad 70 through the safety output chute 12 by rotation of the knob 82. This is particularly advantageous where short sections of pad 70 are cut which may not extend through the output chute 12 through normal operation of the machine.

Figure 5:
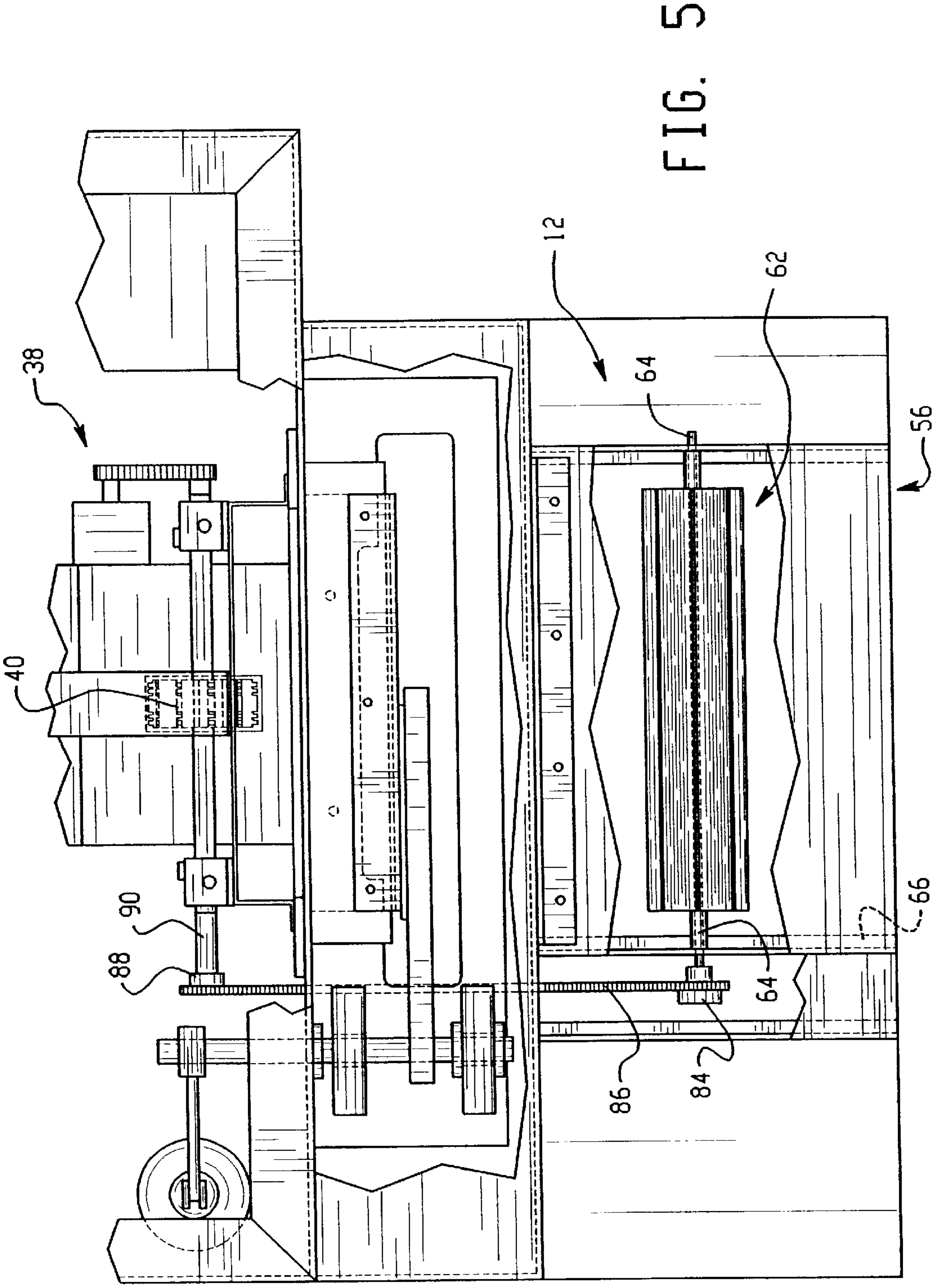
FIG. 5 is a partial top view of a cushioning conversion machine and the rotating vane assembly powered by the cushioning conversion machine.

The rotation of the vane assembly 62 may also be powered, such as is shown in FIG. 5, by extending the shaft 64 through the end wall 66 for connection to a sprocket 84. The sprocket 84 is powered by a connection to the feed assembly 38 through the chain 86. The chain 86 is enmeshed with sprocket 84 of the safety output chute 12 and sprocket 88 connected to the shaft 90 which drives the gears 40 of the feed assembly 38. Consequently, when the conversion assembly 22 (FIG. 1) is producing a pad, as caused by the rotation of the gears 40, the vane assembly 62 will also be rotating to urge the formed pad 70 (FIG. 2) through the safety output chute 12 to the operator.

Figure 6:
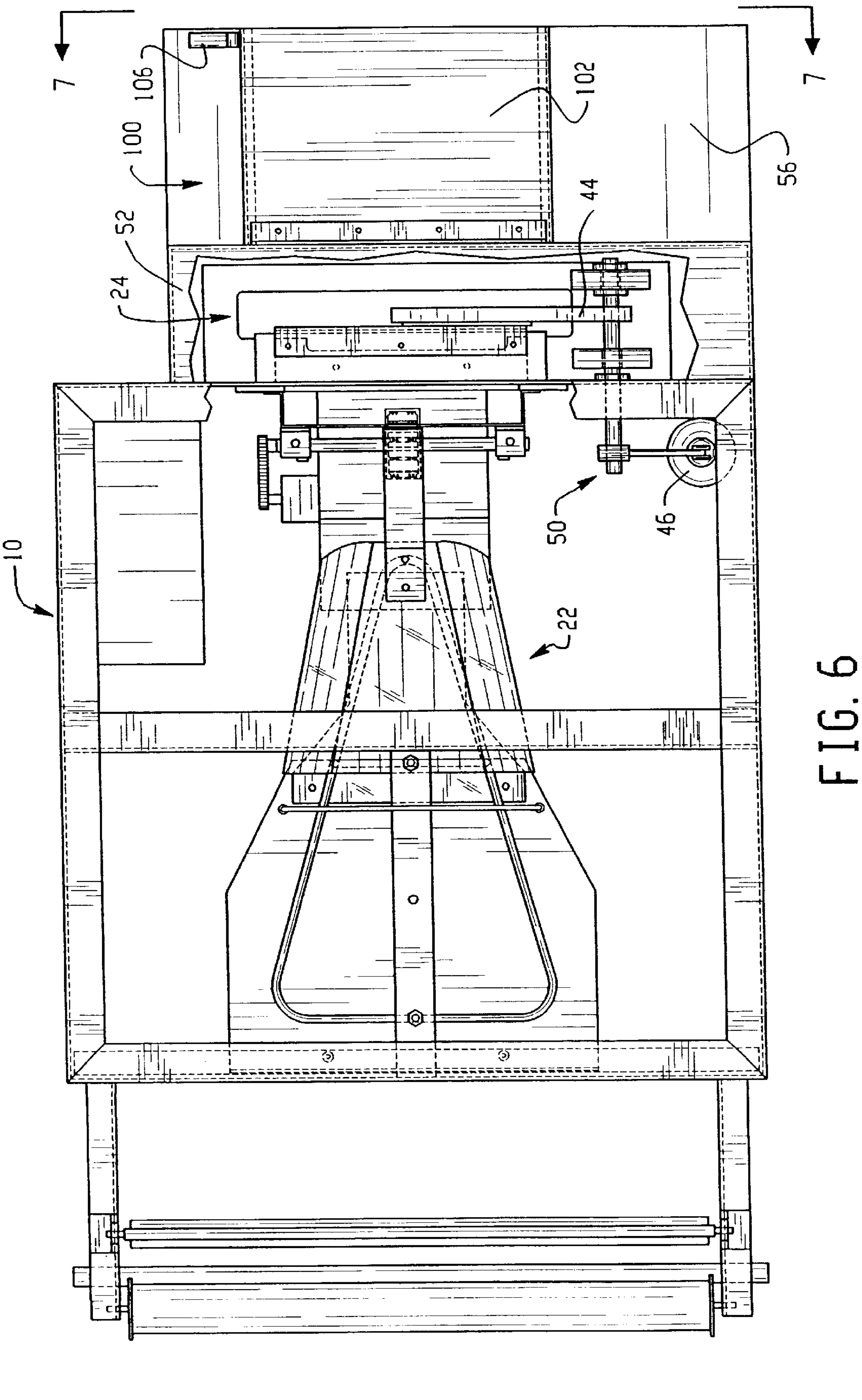
FIG. 6 is a top view of a cushioning conversion machine and an alternate embodiment of a safety output chute including an output sensor.
Figure 7:
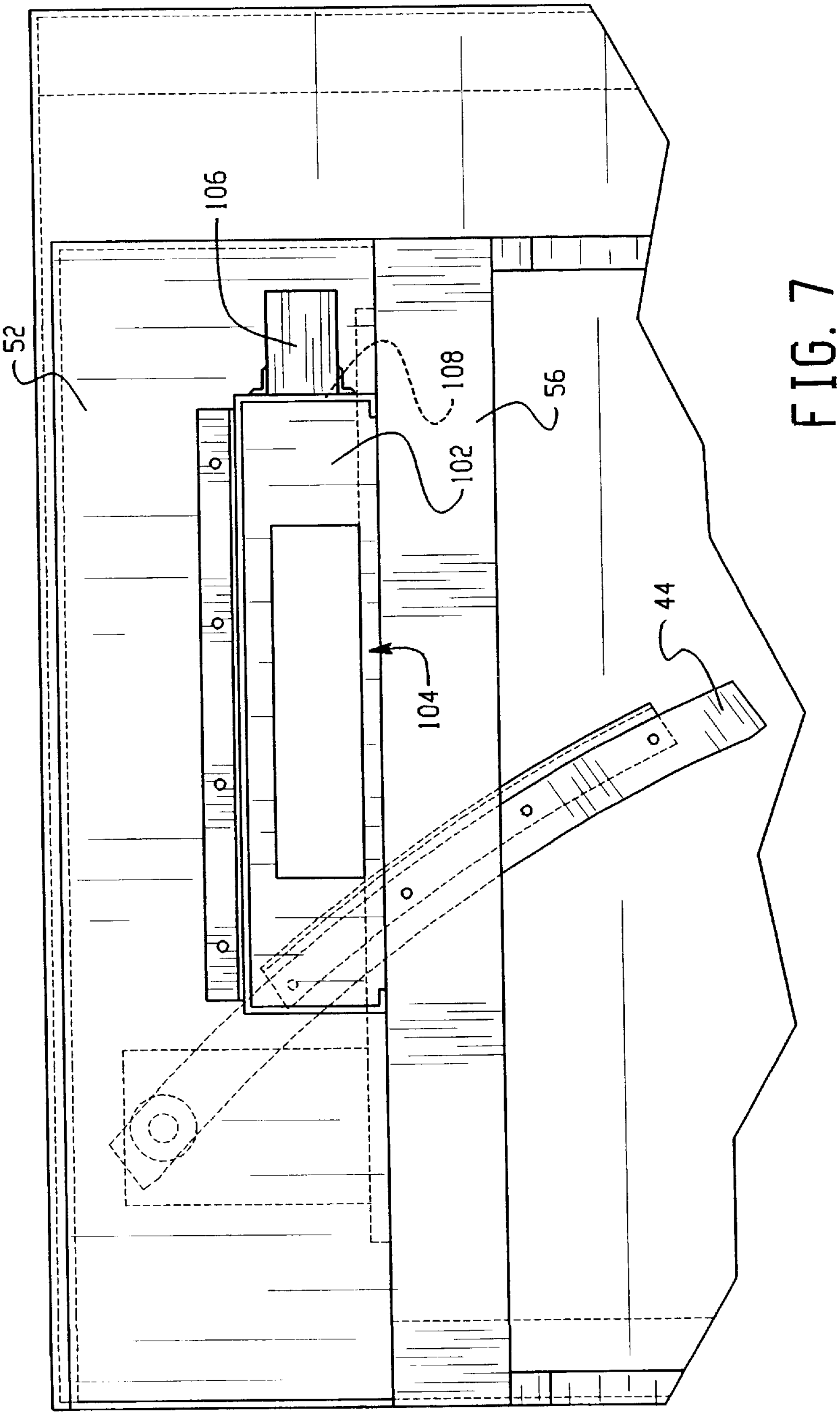
FIG. 7 is a front elevational view of the safety output chute of FIG. 6.

A safety output chute 100 employing a sensor for sensing the presence of a foreign object, such as the hand of an operator, etc., is illustrated in FIGS. 6 and 7 in conjunction with an exemplary cushioning conversion machine 10. The output chute 100 includes a housing generally rectangular in cross-section which is connected to the cutting assembly enclosure 52 and supported by the frame extension 56. The housing 102 defines a chute through which the pad formed by the cushioning conversion assembly 22 travels to an operator through an opening 104. Positioned near the opening 104 of the housing 102, on a side wall thereof, is a sensor 106 for sensing the presence of an object within the chute defined by the housing. The sensor 106 preferably has sensing access within the housing 102 through a port or access opening 108. The sensor 106 may be any one of a number of conventional sensors for sensing the presence of a foreign object, such as an infrared heat sensor or a capacitance sensor, and generating a signal responsive to the absence or presence of such a foreign object, such as a human appendage, for example a hand or fingers, in the housing 102 near the sensor. Preferably the sensor 106 is capable of discriminating between a pad and a foreign object such as the hand of the operator. An infrared sensor, for example, could discriminate based on the heat as a hand or fingers would give off more heat than a pad. A capacitance sensor would discriminate based on the capacitance in the chute as the capacitance of a hand or fingers, for example, is different and distinguishable from the capacitance of a pad.

The signal generated by the sensor 106 is provided through conventional means to the process controller which is programmed to prevent the operation of the cutting assembly 24, such as through disabling the motor 46 of the cutting assembly 24, when an object is in the housing 102 as sensed by the sensor 106. Alternatively, the signal generated by the sensor 106 can be routed to a circuit dedicated to enabling or disabling the motor 46 powering the cutting assembly 24.

Figure 8:
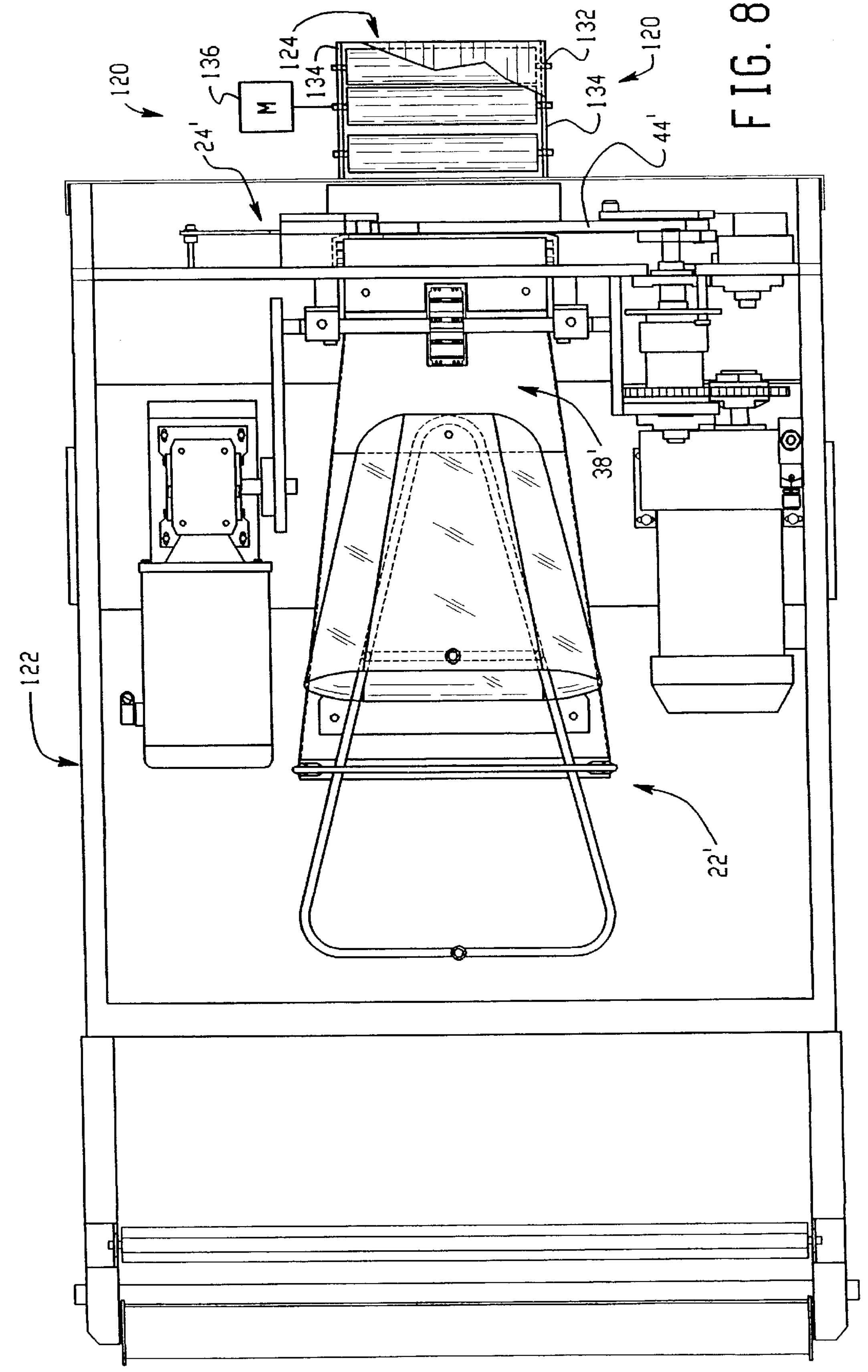
FIG. 8 is a top view of a cushioning conversion machine and an alternate embodiment of a safety output chute including a labyrinth of rollers.
Figure 9:
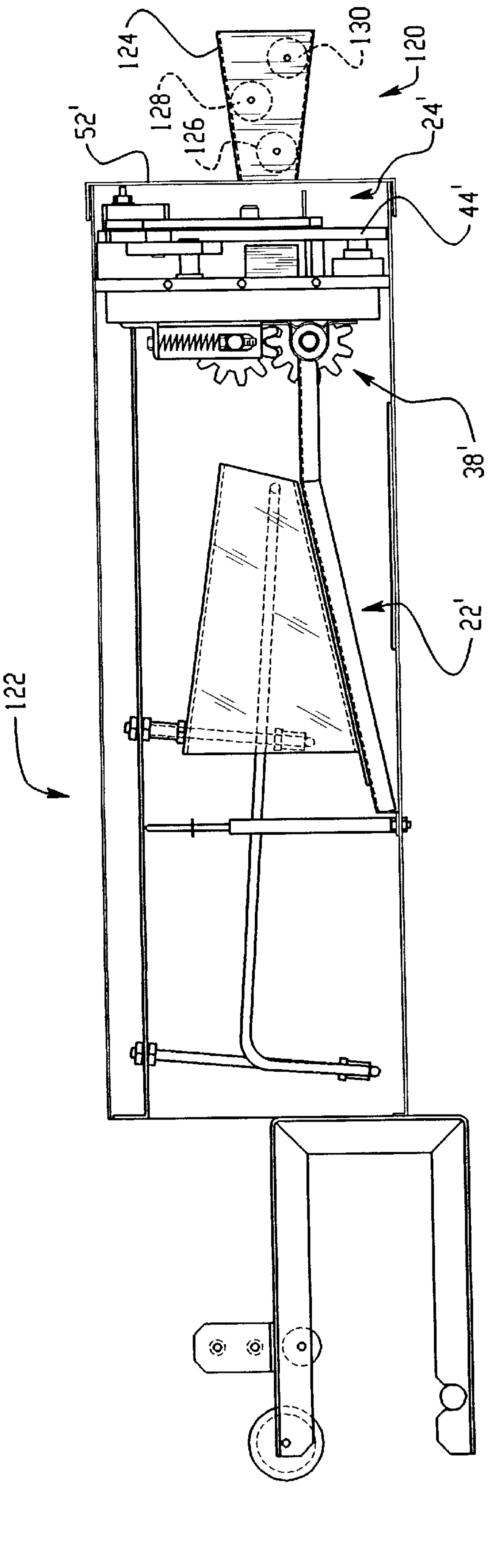
FIG. 9 is a side elevational view of the cushioning conversion machine and safety output chute of FIG. 8.
Figure 10:
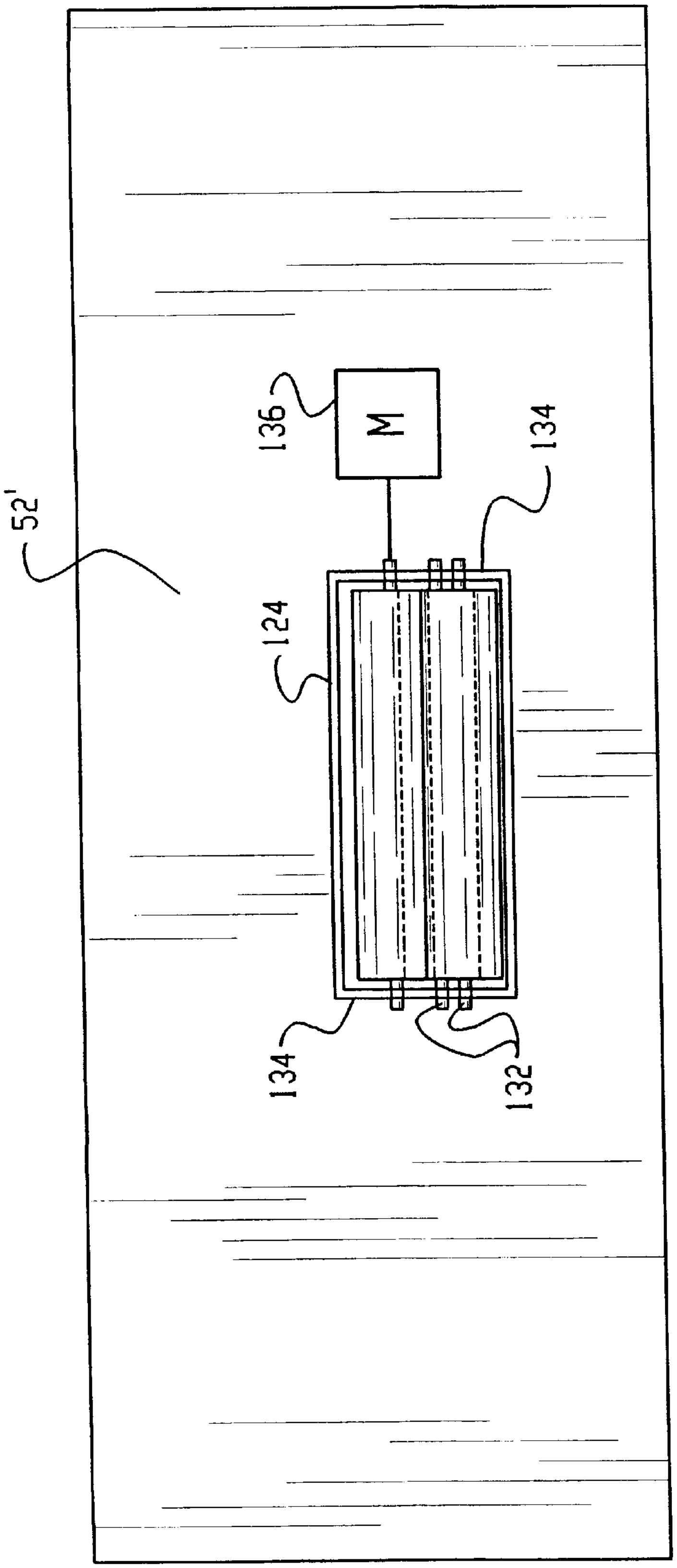
FIG. 10 is a front elevational view of the safety output chute of FIG. 8.

A labyrinth-like safety output chute 120 is shown in FIGS. 8 through 10 in conjunction with an exemplary cushioning conversion machine 122. The cushioning conversion machine 122 is similar in design to that described above relative to FIG. 1, and is more comprehensively described in U.S. Pat. No. 5,322,477, for instance, which is incorporated herein in its entirety by this reference. (Reference numerals for assemblies of the cushioning conversion machine 122 which perform the same general functions as assemblies of the cushioning conversion machine 10 are designated by the same primed numbers.) It should be understood that the labyrinth output chute 120 may be equally employed with a cushioning conversion machine of the type depicted in FIG. 1 or a cushioning machine of a different type and that the safety output chutes 12 and 100 could be employed with the exemplary cushioning conversion machine 122 of FIG. 8 or other cushioning conversion machines not illustrated or discussed herein.

The labyrinth safety output chute 120 acts to prevent the ingress of the hand of an operator to the blade 44' of the cutting assembly 24' by requiring the pad to progress through the chute along a path, such as a generally tortuous, non-linear or undulating path, that the hand and arm of an operator could not traverse. The labyrinth output chute 120 includes a housing 124 mounted to an enclosure 52' substantially enclosing cutting operation of the cutting assembly 24', the housing defining a chute for a pad to travel though from the cutting assembly to the point of an operator or other transitional or pad storage area. The housing 124 may be of a constant cross-section or the housing may diverge in the downstream direction as shown in FIG. 9. Disposed within the housing 124 are a number of cylindrical guide rollers 126, 128 and 130 defining a tortuous path through the chute for the pad to travel. Each guide roller 126, 128 and 130 includes a shaft 132 extending between and rotatably mounted to opposite side walls 134 of the housing 124 such that the axis of rotation of the rollers will preferably be parallel to a plane which passes laterally through the pad as it approaches the rollers from the cutting assembly 24'. While not so limited, the guide rollers 126, 128 and 130 are preferably of the same length and extend substantially across the lateral width of the housing 124 between side walls 134. Preferably the open space between the outer peripheries of adjacent guide rollers 126, 128 and 130 is determined so as to permit a pad to fit therebetween with minimal compression of the pad. Further, the vertical distance between the centerlines of the guide rollers is so chosen that the pad is forced to follow an undulating or somewhat inclined "S" shape path and to bend or undulate in a substantially vertical direction to follow the path. Although the guide rollers 126, 128 and 130 are shown as being spaced substantially the same distance from each other, the guide rollers can be offset so that the distance between adjacent rollers is not the same.

Instead of the guide rollers 126, 128 and 130 being attached in fixed positions within the housing 124 the shafts 132 alternatively could be independently spring biased with the travel for each roller being limited such that the rollers continue to overlap so as to maintain a labyrinth function. The housing 124 could also be provided with lateral guides in order to direct the travel of the pad between the rollers 126, 128 and 130.

The rotation of the guide rollers 126, 128 and 130 could be effected passively, by movement of the pad through the labyrinth, or actively, either by a separate motor 136 driving one or more of the guide rollers, or by coupling one or more of the guide rollers to the feed assembly 38' much in the same way as the vane assembly 62 is coupled to the feed assembly 38 in the manner shown in FIG. 5.

The outer surface of each guide roller 126, 128 and 130 preferably allows sliding contact with the pad in an application where the rollers are not powered separate from the movement of a pad therebetween, and a somewhat gripping contact with the pad when the rollers are separately powered to urge the pad through the labyrinth output chute 120. The construction of the rollers 126, 128 and 130 may be chosen a variety of materials based on the application. Additionally, if desired, the rollers could serve a dual purpose by also perforating the pad or making a marking on the pad so as to facilitate use of a pad length measuring device in conjunction with the labyrinth safety output chute 120.

In operation, a pad (not shown) formed by the conversion assembly 22' passes through the cutting assembly 24' to the labyrinth safety output chute 120 where its is fed above the first guide roller 126 rotating clockwise, below the second guide roller 128 rotating counterclockwise and above the last guide roller 130 rotating clockwise and then emanates from the chute for use by the operator.

Figure 11:
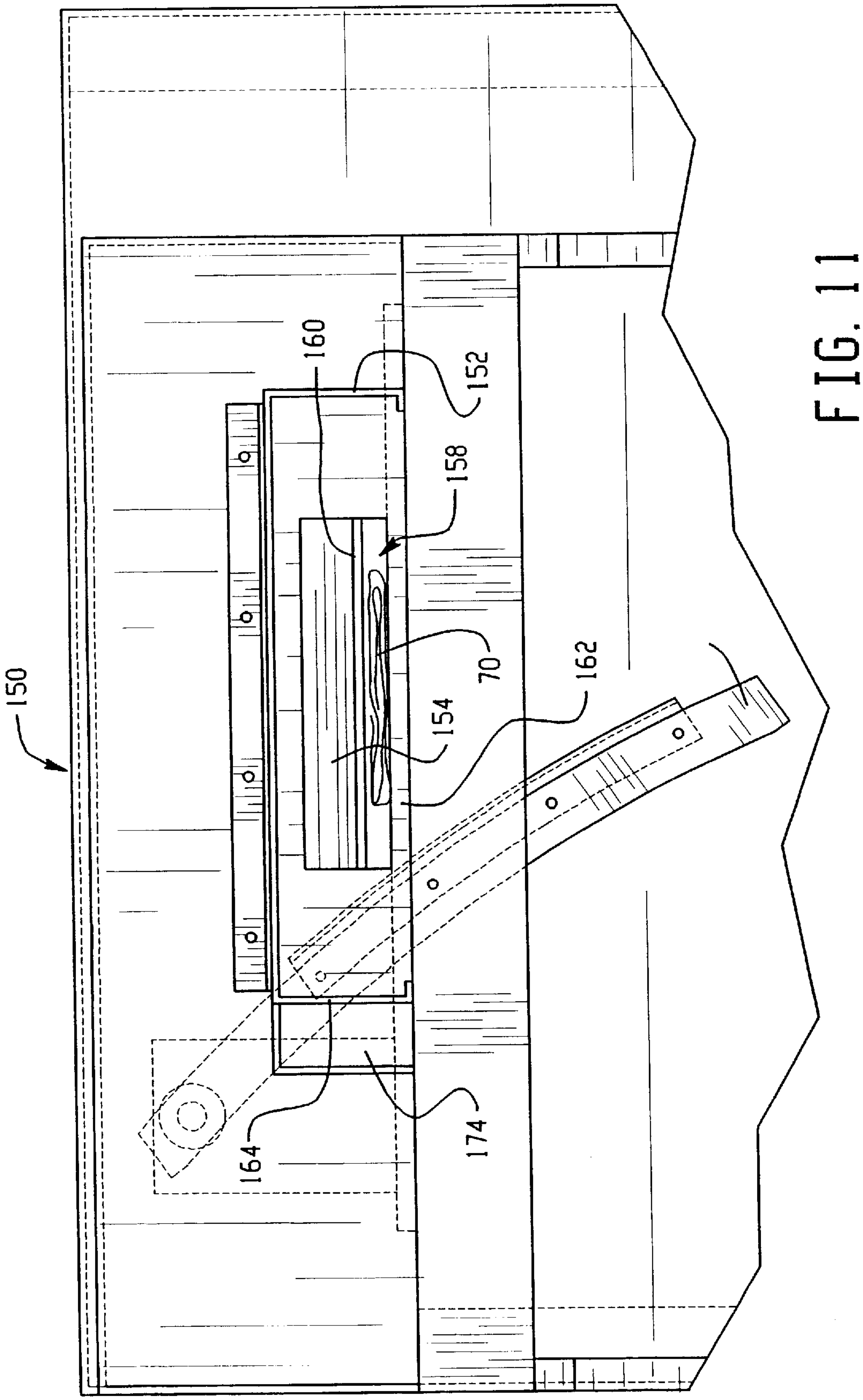
FIG. 11 is a front elevational view of an alternate embodiment of a safety output chute including a movable shield.
Figure 12:
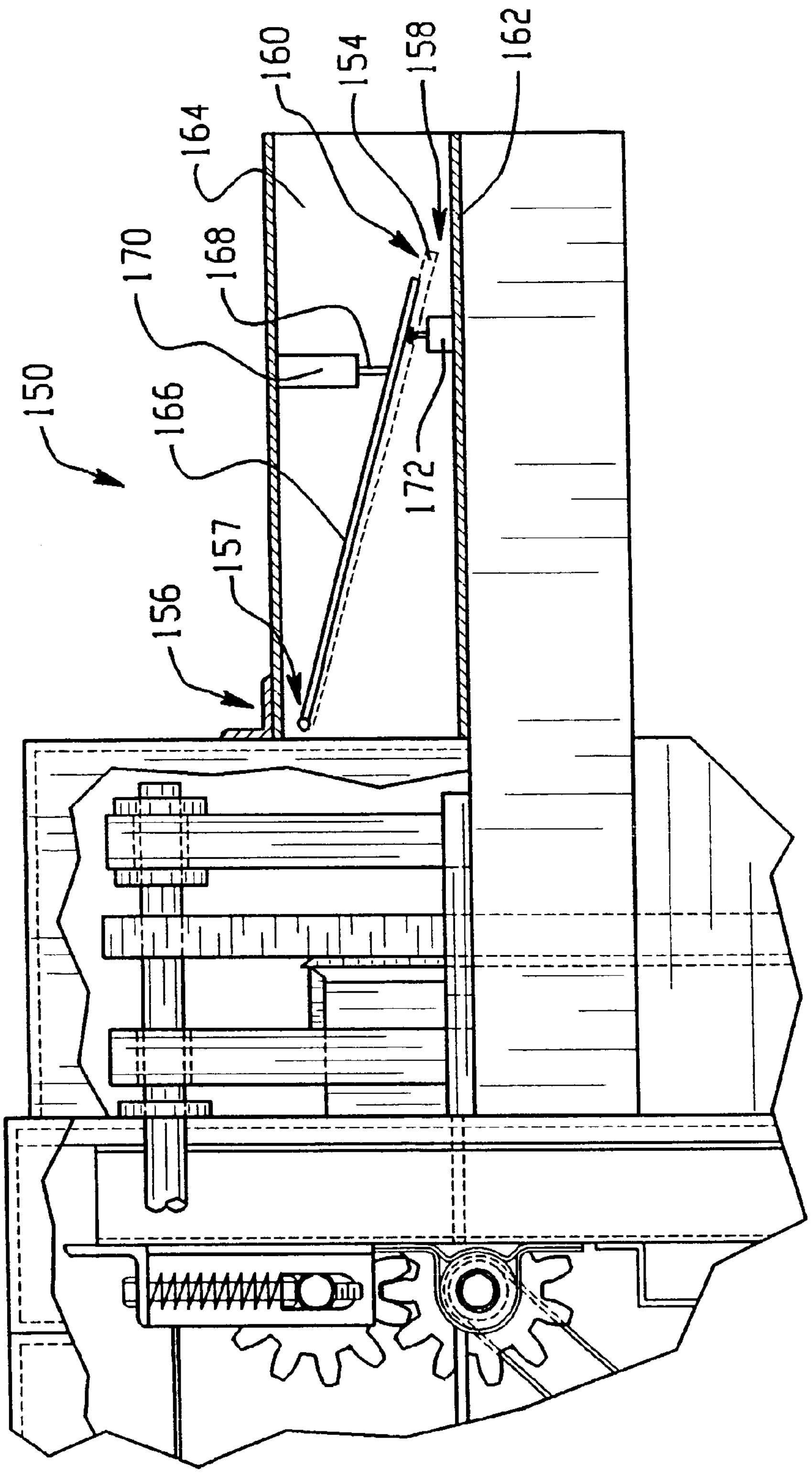
FIG. 12 is a side elevational view of the safety output chute of FIG. 11.
Figure 13:
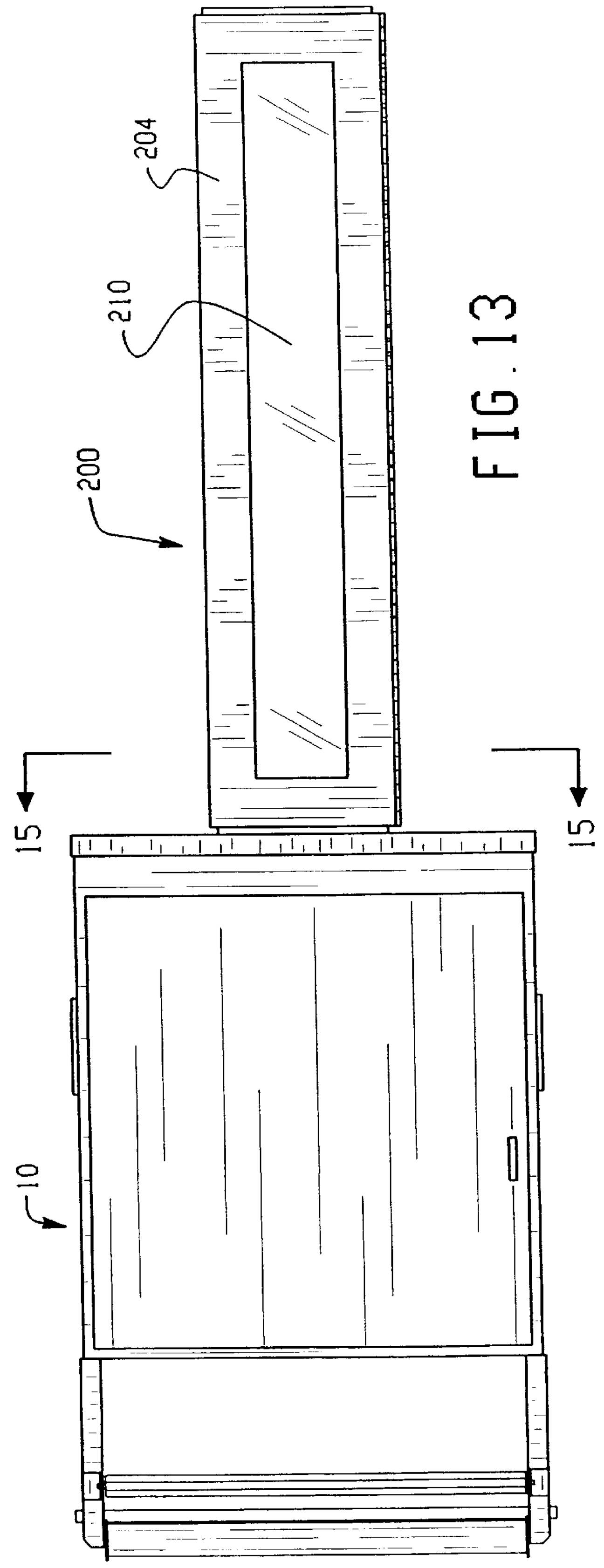
FIG. 13 is a top view of a cushioning conversion machine employing an alternate embodiment of a safety output chute having an access cover.
Figure 14:
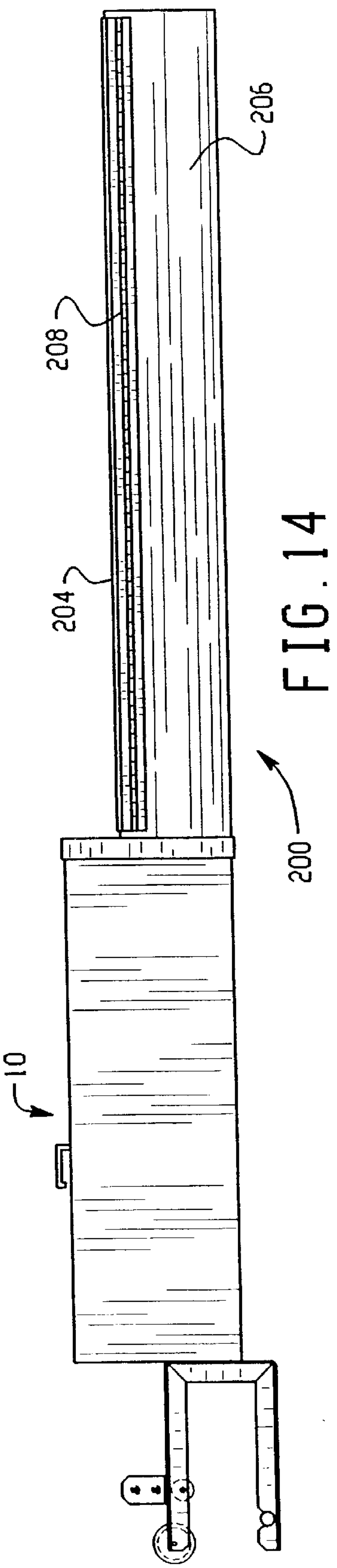
FIG. 14 is a side elevational view of the cushioning conversion machine and safety output chute of FIG. 13.

A further embodiment of an safety output chute 150 for use with a cushioning conversion machine, such as the machine 10 illustrated in FIG. 1, is shown in FIGS. 11 and 12. The safety output chute 150 includes a housing 152 of the same basic design as the housing 102 shown in FIGS. 6 and 7 and described above. Disposed within the chute defined within the housing 152 is a shield 154 which is connected at its upstream end 156 to the upper, upstream portion of the housing by a hinge 157. The shield 154 extends downwardly in the downstream direction to define a space 158 between the distal end 160 of the shield 154 and the bottom wall 162 of the housing 152 through which the pad 70 traverses. Extending from the shield 154 through a side wall 164 of the housing 152 in order to be operative outside of the housing 152 is a lever 166 which moves with shield 154 within the housing. The lever 166 is connected to a piston portion 168 of a solenoid 170 which is in turn mounted to the outer face of the side wall 164 of the housing 152. Operation of the solenoid 170 thus moves the lever 166 and likewise the shield 154 within the housing 152. A limit switch 172 mounted to the outer face of the side wall 164 of the housing 152 below the lever 166 generates a signal indicative of whether the lever, and thus the shield 154, are in their lowermost or closed condition, wherein the shield slightly compresses the pad 70 or senses the presence of a hand in the chute because the chute is in a relatively raised position. The solenoid 170 is controlled by the previously noted process controller 51 which also receives the signals generated by the limit switch 172. Preferably the lever 166, the solenoid 170 and the limit switch 172 are contained within an enclosure 174.

In operation, while a pad 70 is being formed by the conversion assembly 22, the piston portion 168 of the solenoid 170 is in a retracted state thus drawing the lever 166 and shield 154 to a relatively upper or open state away from the bottom wall 162 thus increasing the space 158 through which the pad may traverse within the chute. Upon initiation of a cutting operation, the process controller 51 causes the solenoid 170 to extend the piston portion 168 forcing the lever 166 and the shield 154 relatively downwardly to narrow the space 158 and compress the pad 70 therein. The force exerted by shield 154 on the pad is preferably adequate to compress the pad as desired, but limited so as not to present a hazard to a hand below the shield. If only the pad is in the chute, then this action causes the lever 166 to contact the limit switch 172 which generates a signal to the process controller 51 indicating that the shield 154 is in its relatively closed position. Upon receipt of the signal from the limit switch 172 confirming that the shield 154 is in its closed position, the process controller 51 causes the cutting assembly 24 to execute a cut of the pad 70. If a foreign object were in the opening 158 preventing the shield 154 from reaching its fully closed position, the process controller 51, sensing this fact from the output of the contact switch 172 in its open position, would prevent the execution of a cut. Furthermore, if the shield 154 were forced open, away from its closed position, during a cutting operation, the process controller 51 would interrupt the cutting operation. Alternatively of the limit switch 172 providing a signal to the process controller 51, the limit switch may act as a true switch in series with the cut motor or solenoid 46 preventing its operation when the limit switch is in its open position.

Figure 15:
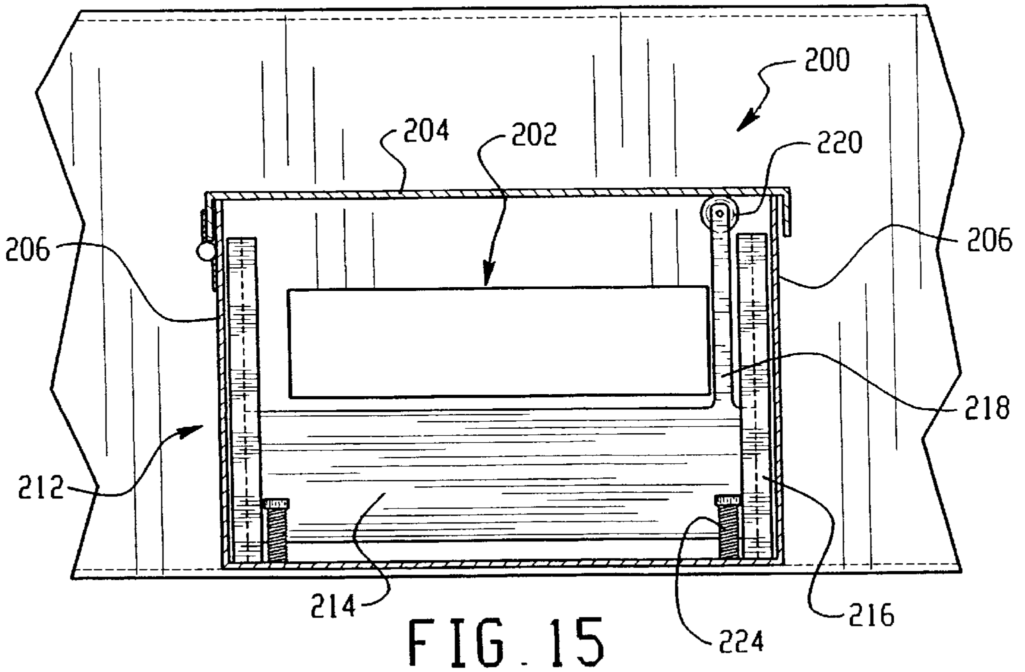
FIGS. 15 and 16 are end views of the closure assembly in a closed position and an open position, respectively, for the safety output chute of FIG. 13.
Figure 16:
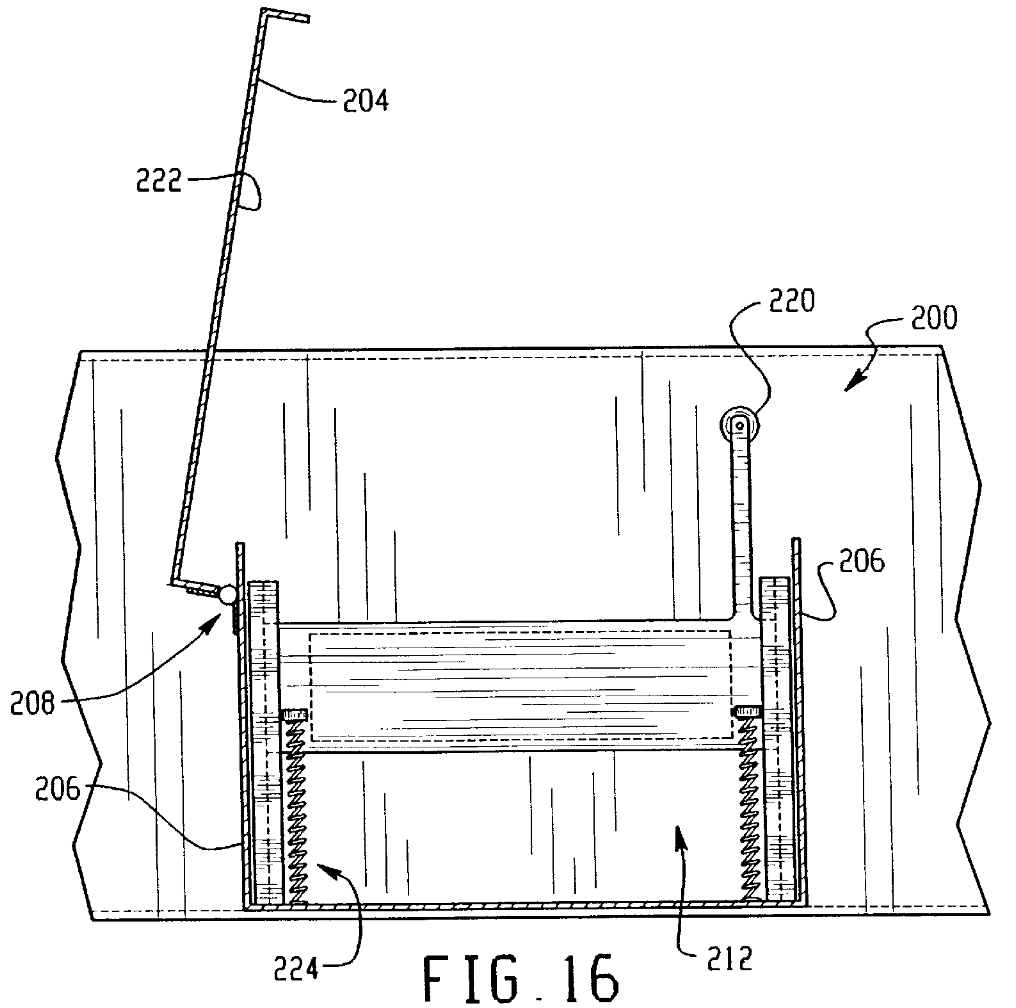
Figure 17:
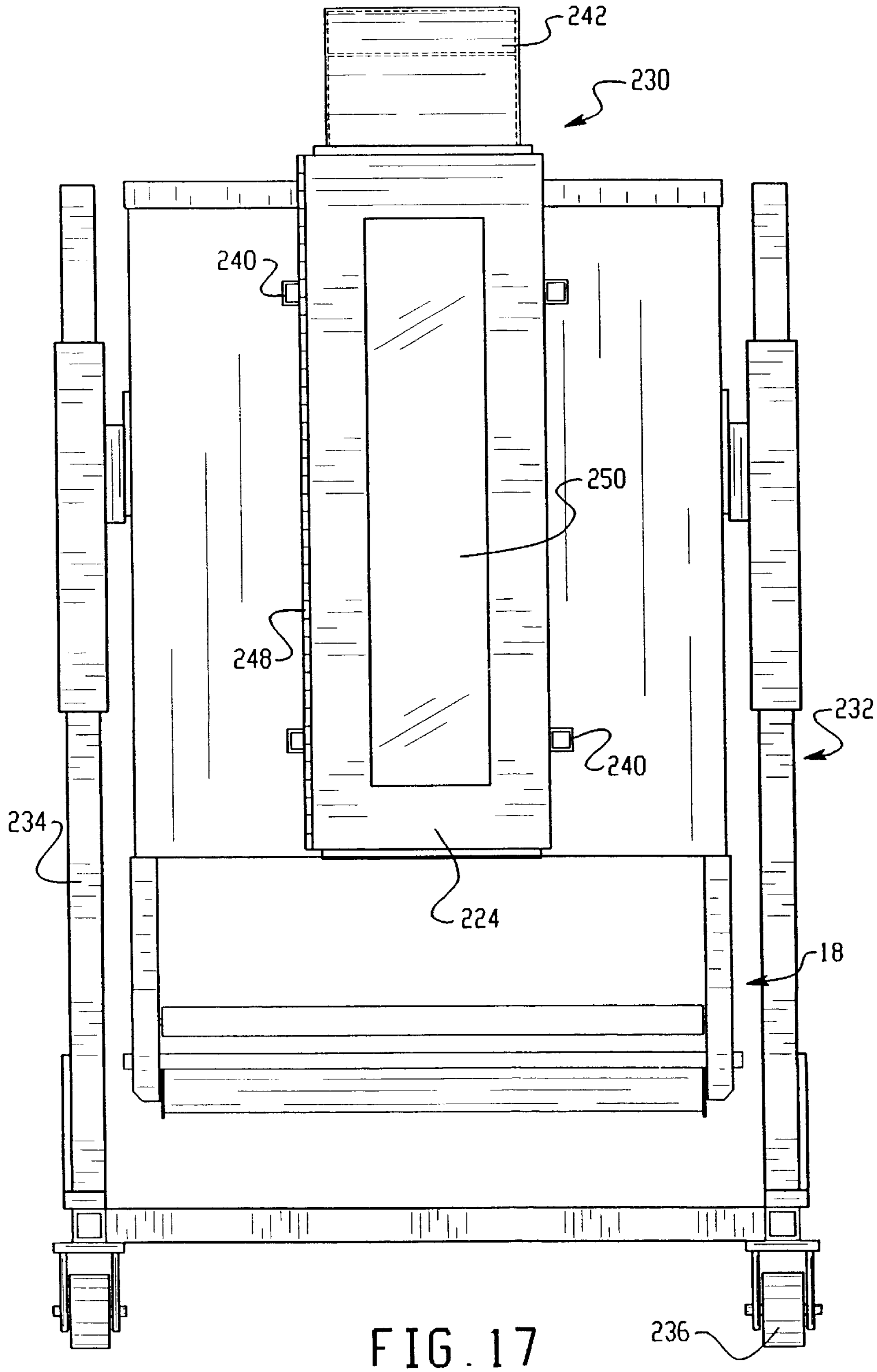
FIG. 17 is a front elevational view of a cushioning conversion machine in an alternate embodiment of a safety output chute having an access cover.
Figure 18:
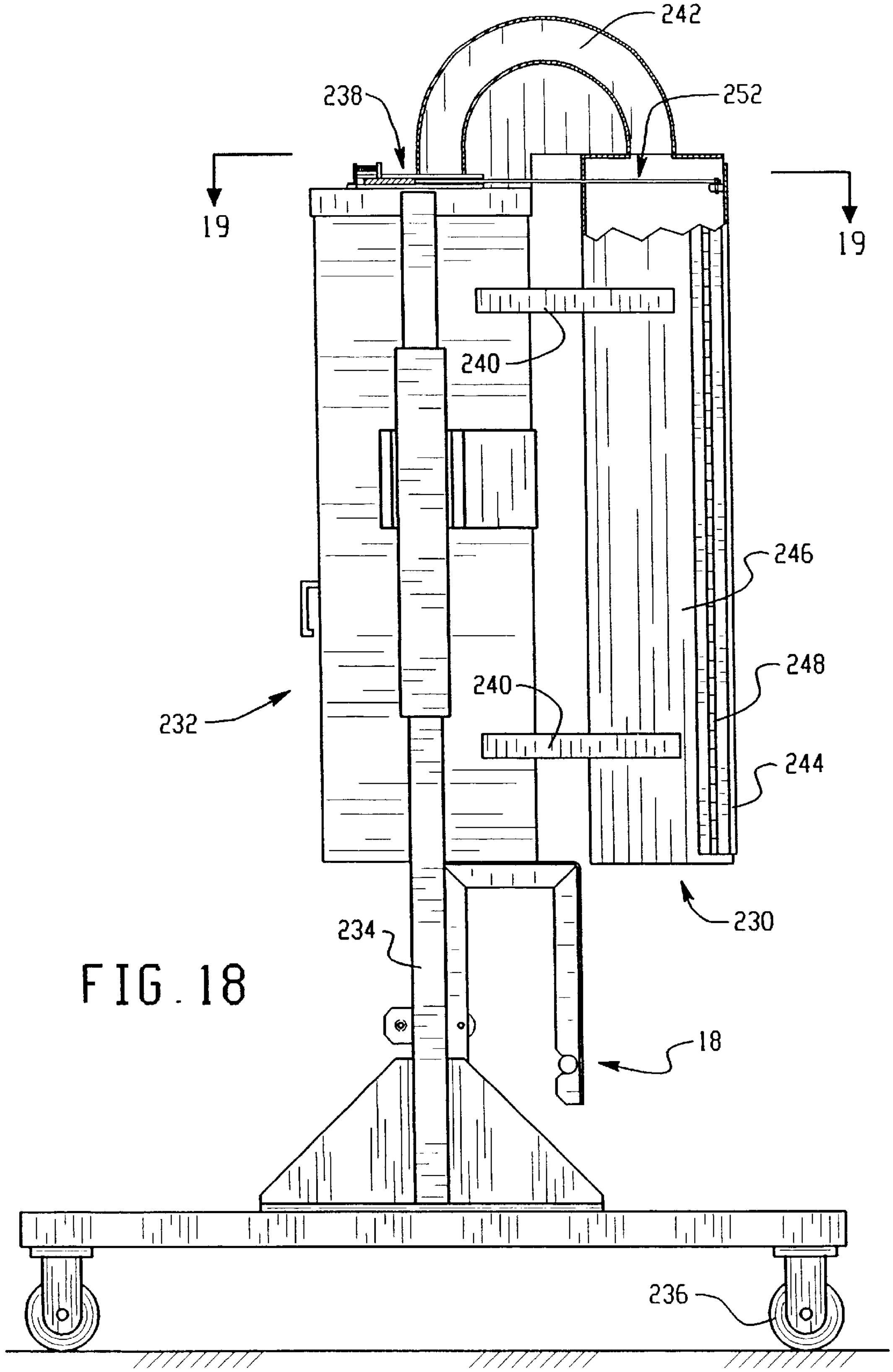
FIG. 18 is a side elevational view of a cushioning conversion machine and safety output chute of FIG. 17.

With reference to FIGS. 13 through 16 there is shown an embodiment of a safety output chute 200 for collecting cut pads once they have been cut and deposited into the chute. The safety output chute 200 is connected to a cushioning conversion machine 10 downstream of the cutting assembly (not shown) adjacent an output passage 202 (FIG. 15). In this embodiment the safety output chute 200 and cushioning conversion machine 10 function cooperatively in a manner similar to a vending machine. The safety output chute 200 includes a cover 204 mounted to a chute body 206 by means of a hinge 208. Preferably the cover 204 includes a transparent insert 210 which permits the operator to see a pad within the safety output chute 200. It is also preferable that during the formation of a pad and while the pad is being cut to the desired length, the cover 204 be locked into a closed position and that only upon the completion of a cutting operation is the operator permitted to open the cover to obtain the pad from inside the chute. The safety output chute 200 may also, but not necessarily, include an assembly 212 which permits a pad to travel from the machine to the safety output chute 200 when the cover 204 is in its closed position, as shown in FIG. 15, but which closes off access to the machine and cutting assembly (not shown) through the opening 202 when the cover is in an open position, as shown in FIG. 16. The closure assembly 212 includes a sliding door element 214 which is operable to slide vertically within guides 216 spaced at opposite lateral sides of the chute 200. The sliding door 214 includes a vertical projection 218 including a wheel 220 at an end distal from the main portion of the door for contact with the inside surface 222 of the cover 204. The sliding door 214 is biased vertically upwardly by a pair of springs 224. Consequently, when the cover 204 of the safety output chute 200 is in a closed position, as shown in FIG. 15, the wheel 220 is forced downwardly causing the sliding door to slide downwardly by compressing the springs 224 and permitting access via the opening 202 to the cutting assembly for receipt of a pad. When the door 204 is in an open position, the springs 224 urge the sliding door 214 in an upward direction to substantially cover the passage or opening 202 and permit access to the cutting assembly. When the cover 204 is again closed it will contact the wheel 220 which will rotate against the underside 222 of the cover 204 as the cover forces the sliding door 214 downwardly by compressing the springs 224 and again permitting access between the machine and the safety output chute 200 via the passage 202. The safety output chute 200 may be provided with sensors or limit switches (not shown) to sense whether the cover 204 is in an open or closed position and to disable or enable a cutting operation accordingly.

The end of the safety output chute 200 remote from the machine 10 can be open or closed. An open end permits pads of unlimited lengths to be produced, but in such an instance the chute should be of sufficient length to inhibit physical access by the operator to the cutting assembly 24 from the open end.

A further embodiment of a safety output chute 230 configured with a cushioning conversion machine 10 to operate analogous to a vending machine is shown in FIGS. 17 through 20. In this embodiment, the machine 232 is preferably supported on a frame 234 in an upright, vertical position. In such an instance the frame may also include casters 236 to facilitate movement of the cushioning conversion machine to an appropriate location where strip material is desired at a given time. The cushioning conversion machine 232 is preferably oriented vertically with the stock supply assembly 18 located relatively near the floor and the machine output 238 facing upwardly. The safety output chute 230 is mounted in a vertical orientation adjacent the cushioning conversion machine 232 by a number of mounting brackets 240. A pad is transferred from the cushioning conversion machine 232 to the safety output chute 230 through a 180° arcuate passage 242 located above the cushioning conversion machine and the output chute. The safety output chute 230 preferably includes a cover 244 mounted to the chute body 246 by a hinge 248. The chute cover 244 preferably also includes a transparent window insert 250 to permit the operator to visually determine whether a pad has been deposited into the safety output chute 230. The safety output chute 230 is provided with a sensor or limit switch which permits operation of the cushioning conversion machine 232 only when the door 244 is shut and may either alternatively or with the limit switch include a means for locking the cover 244 in a closed condition when the cushioning conversion machine is in operation. The end of the output chute 230 remote from the cushioning conversion machine 232 may be open or closed.

However, when the end of the output chute 230 is open, as discussed above, the length of the chute should be sufficiently long to inhibit physical access by the operator to the cutting assembly 24 from the open end of the chute.

Figure 19:
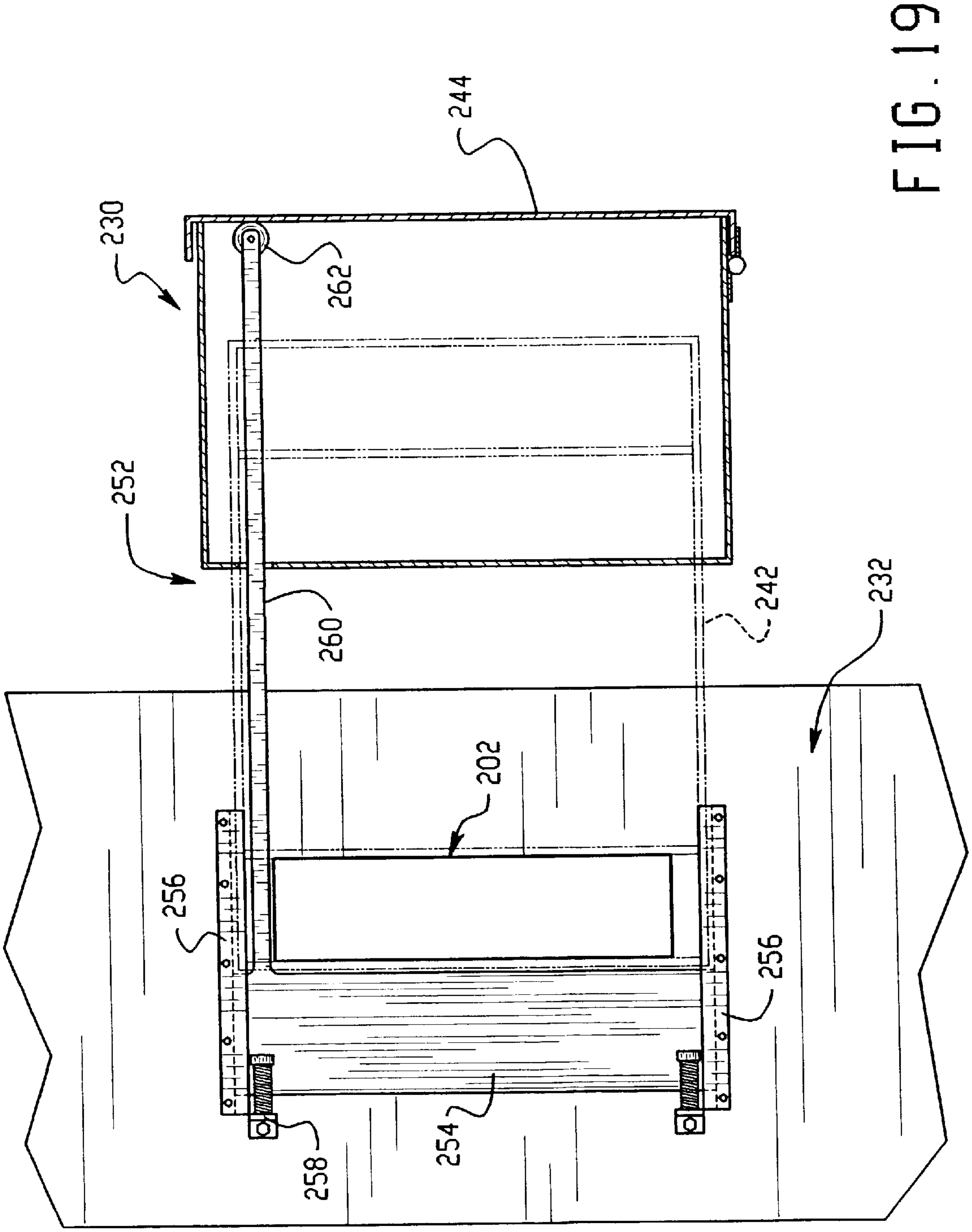
FIGS. 19 and 20 are views of a closure assembly with the access cover of the safety output chute closed and open, respectively.
Figure 20:
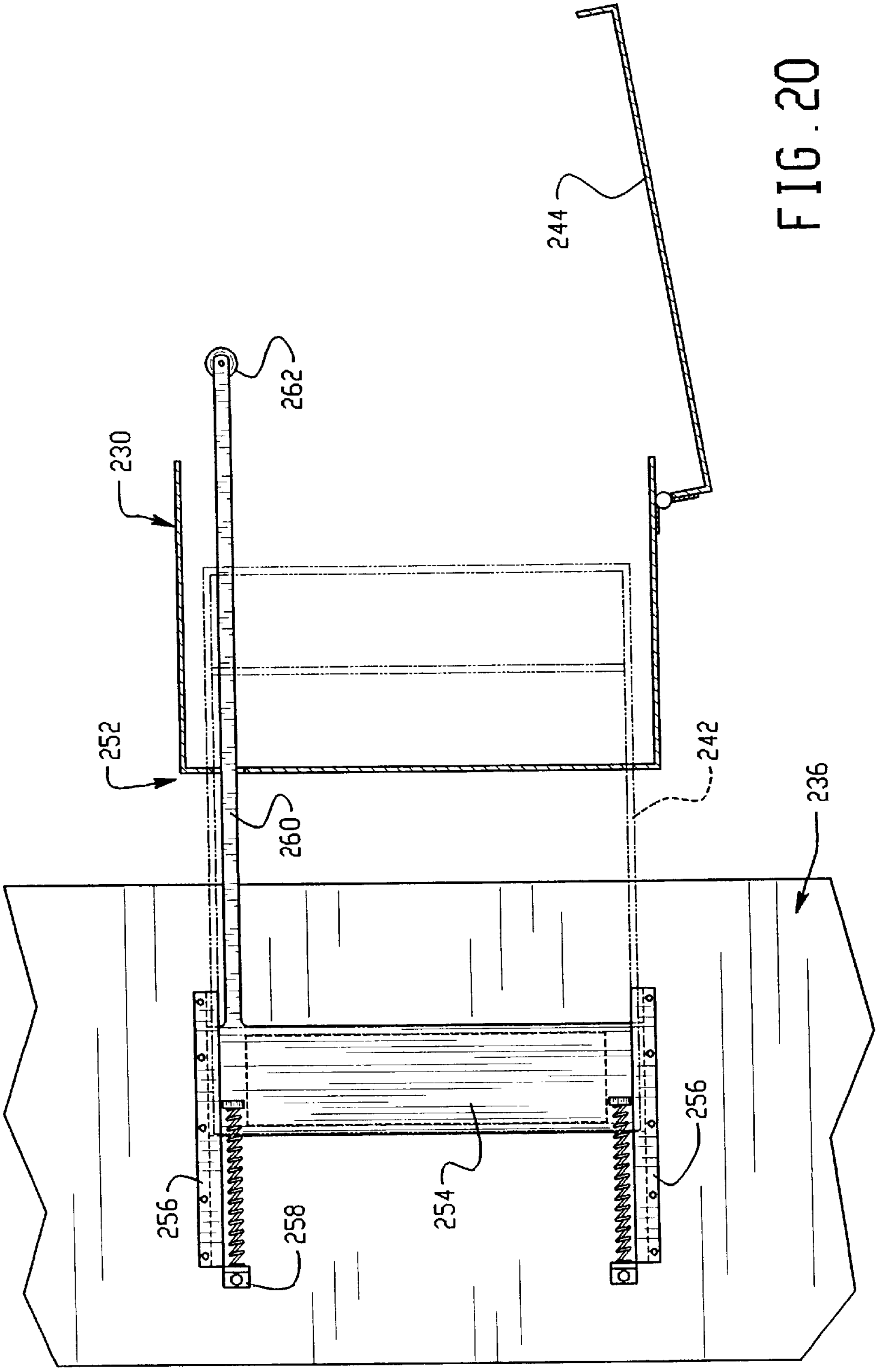

A machine output closure assembly 252 may also be provided to close the machine outlet 202 when the cover 244 is in an open position, as shown in FIG. 20 and to open access from the machine output to the arcuate passage 242 when the cover is closed, as shown in FIG. 19. The closure mechanism 252 is configured similar to the closure mechanism 212 illustrated in FIGS. 15 and 16. The closure mechanism 252 includes a sliding door 254 which alternatively opens the machine outlet 202 when in a retracted position and closes access to the machine output when in its unretracted position when the door 244 of the safety machine output chute 230 is open. The sliding door 254 slides horizontally within the slides 256 and is biased towards a closed position by springs 258. An extension 260 extending from the sliding door 254 and terminating in a wheel 262 engages the cover 244 to urge the sliding door into an open or closed position depending upon the position of the cover 244. Consequently, when the door 244 is in a closed position, as shown in FIG. 19, the sliding door 254 is urged towards its open condition retracting the springs 258 to permit access through the machine outlet 202. Conversely, when the cover 244 is in an open condition the springs 258 urge the sliding door 254 into a closed position covering the machine output 202, thus precluding access to the machine and the cutting assembly.

A partially retractable safety output chute 300 is illustrated in FIGS. 21 through 25. As seen in the cross-sections of FIG. 21 and 22, the chute 300 is formed by confronting lower and inverted upper tray shape elements 302 and 304. The lower tray 302 is rigidly connected to the cutting assembly enclosure 52 at an end 306 while the upper tray 304 is hingedly connected to the cutting assembly enclosure by the hinge 308 to pivot upwardly away from the lower tray and provide access to within the output chute 300. The lower and upper trays 302, 304 cooperatively diverge away from the cutting assembly enclosure 52 to form the chute output 310. A deflector plate 312 guides a formed pad 314 (FIG. 24) from the cutting assembly enclosure 52 through the output chute 300.

Disposed within the output chute 300 hingedly connected to the upper tray 304, near the upper wall 315, is a chute guard 316. The chute guard 316 preferably extends from the upper tray 304 sufficiently that when the chute 300 is closed and a pad is not present in the chute, the distal end of the chute guard contacts the lower tray 302 and cannot be freely deflected toward the cutting assembly. The chute guard 316 is preferably composed of two offset curtains or rows 318, 320 of several independent flaps 322, 324, respectively, each rotatably connected to a rod 326 extending between side walls 328 of the upper tray 304 to effect the hinged connection between the upper tray 304 and the chute guard. The flaps 322 of row 318 are offset with the flaps 324 of row 320 by a distance of one-half of the axial length of a flap so that ingress from the chute opening 310 to the cutting assembly enclosure 52 requires that at least one flap of each row be outwardly displaced.

Figure 24:
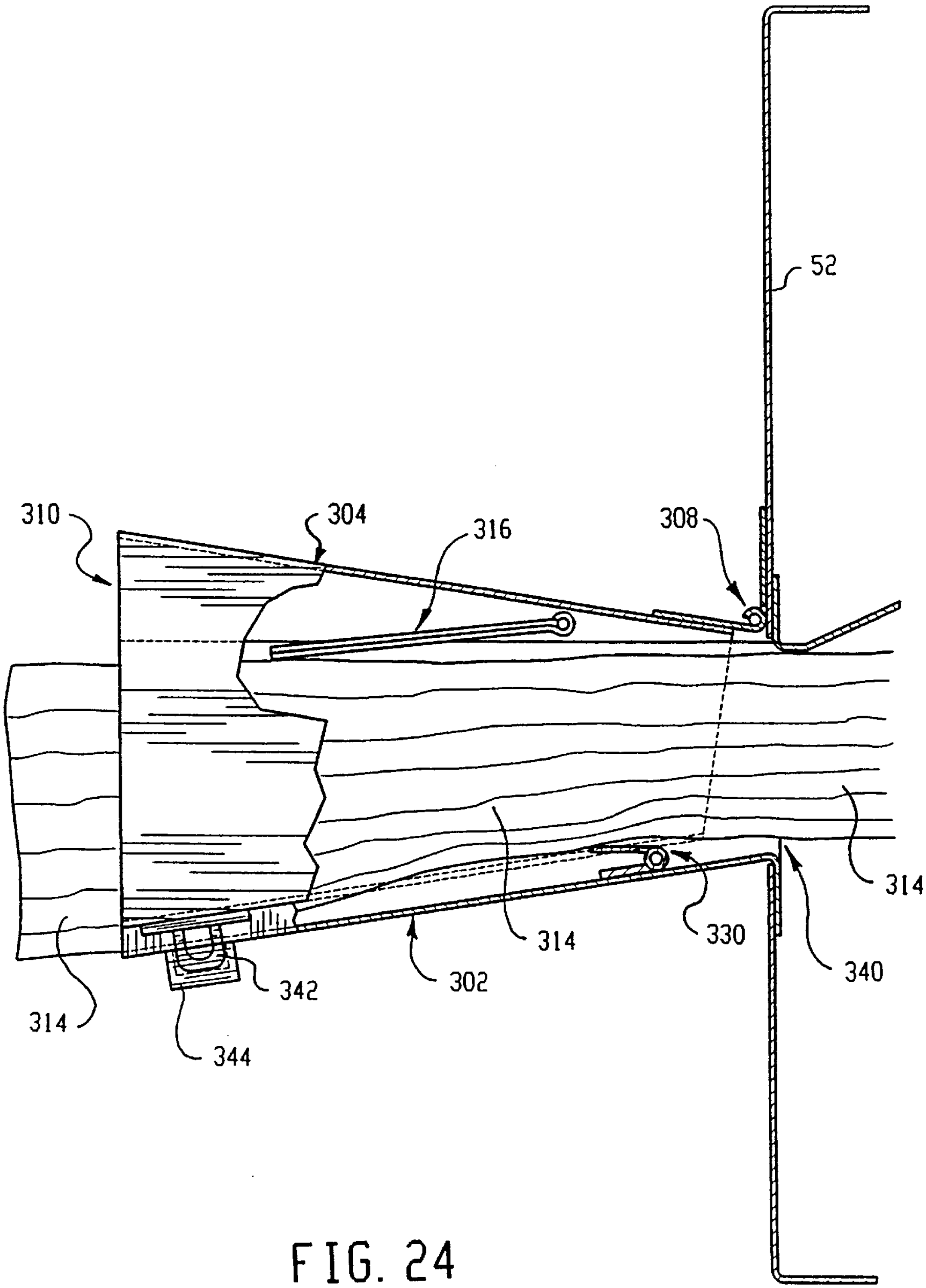
FIG. 24 is a cutaway elevation view of the safety output chute of FIG. 21 with a cushioning product in the chute.

A secondary chute guard 330, is hingedly connected to the lower tray 302 and biased, such as through spring 332, away from the bottom wall 334 of the lower tray to protrude into chute area. The secondary chute guard 330 is angled in its extended biased condition toward the chute opening 310 so that the secondary chute guard can be pressed toward the bottom wall 334 of the lower tray to accommodate a pad through the chute as shown in FIG. 24. The secondary chute guard 330 cooperates with the chute guard 316 to further inhibit access to the cutting assembly enclosure 52 from the chute output 310.

Figure 21:
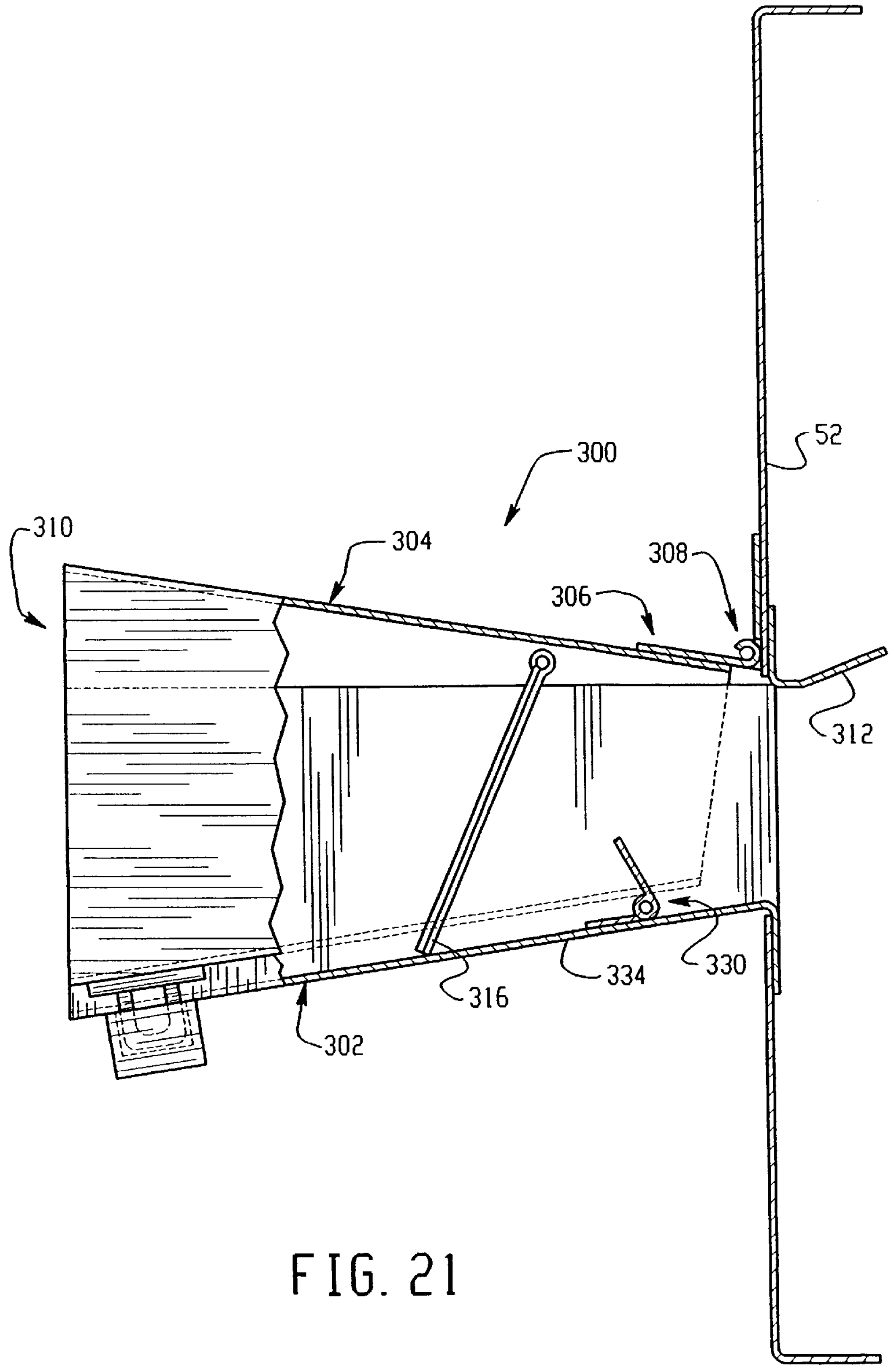
FIG. 21 is a cutaway elevation view of a safety output chute according to an alternate embodiment of the present invention.
Figure 22:
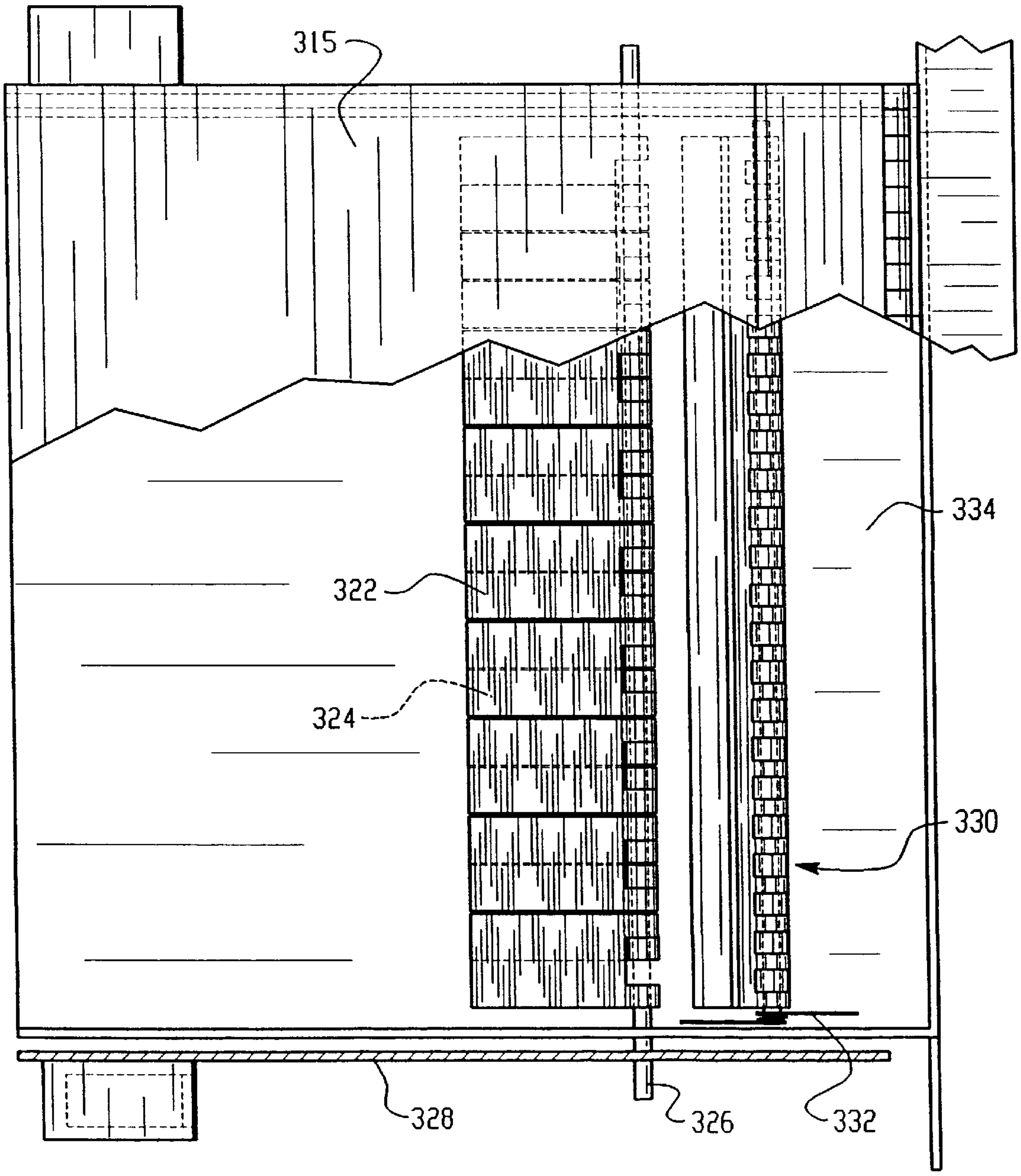
FIG. 22 is a cutaway top view of the safety output chute of FIG. 21.
Figure 23:
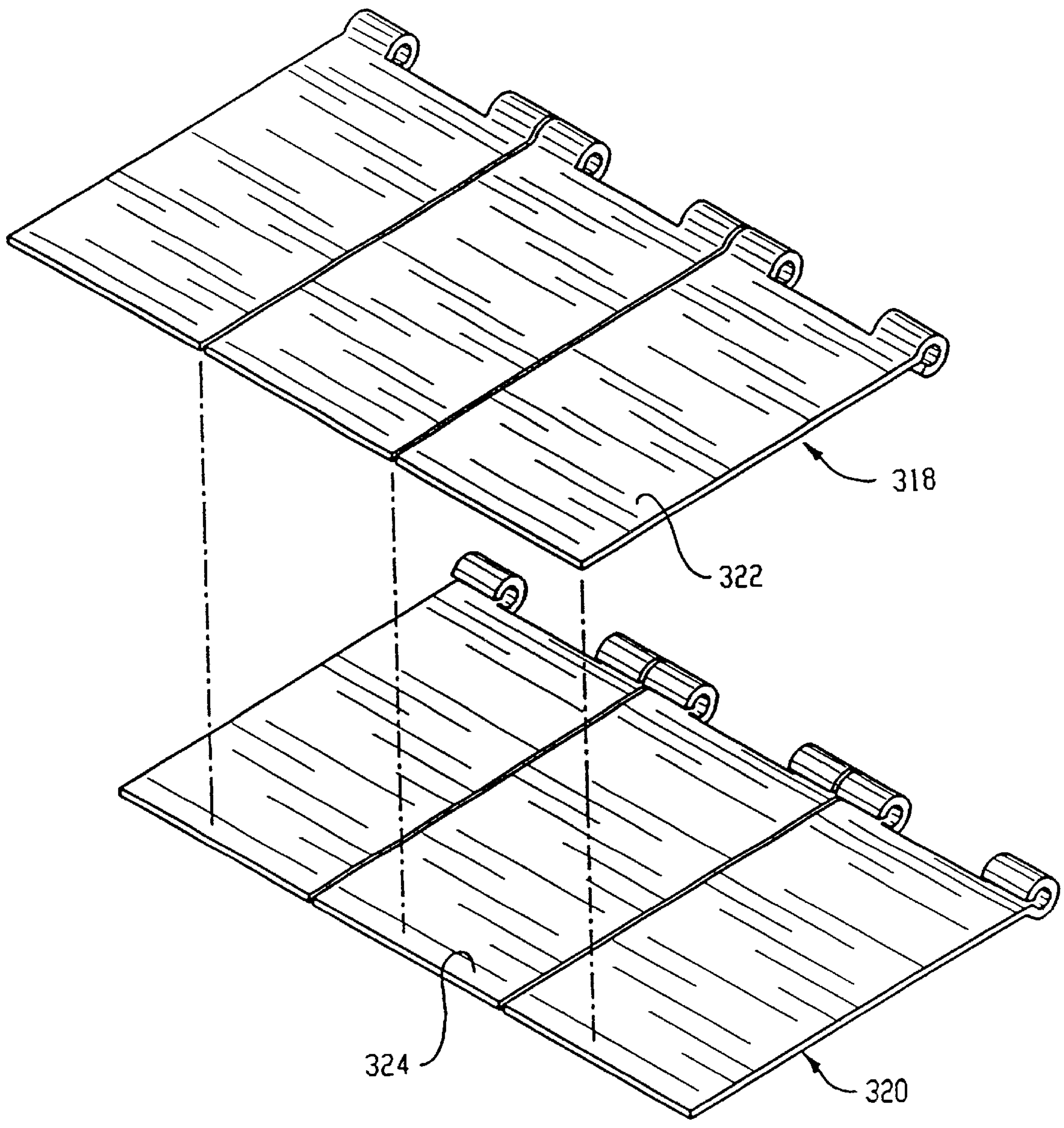
FIG. 23 is a close-up view of the flaps which constitute a part of the chute guide for a safety output chute.

When a pad is not present in the output chute 300 as is the condition shown in FIG. 21, the chute guard 316 extends downwardly away from the upper tray 304, such as through the force of gravity, preferably to contact the bottom wall 334 of the lower tray 302. The secondary chute guard 330 is biased away from the bottom wall 334 of the lower tray 302 to protrude into confines of the output chute. The chute guard 316 and secondary chute guard 330 thus require for an object to progress from the chute output 310 to the cutting assembly enclosure 52 that the object pass below the chute guard 316 and above the secondary chute guard 330 to effectively inhibit access to the cutting assembly 24 within the cutting assembly enclosure 52.

When a pad 314 has been formed by the conversion assembly 22 (FIG. 1) and has been fed through the cutting assembly 24 (FIG. 1) and the safety output chute 300, as shown in FIG. 24, the pad will depress the secondary chute guard 330 downwardly toward the bottom wall 334 and will deflect the chute guard 316 outwardly and upwardly toward the top wall 315 of the upper tray 304. While the chute guard 316 and secondary chute guard 330 are in their respective relatively retracted conditions, ingress through the chute from the chute output is inhibited by the presence of the pad 314 in the output chute along with the chute guards.

Figure 25:
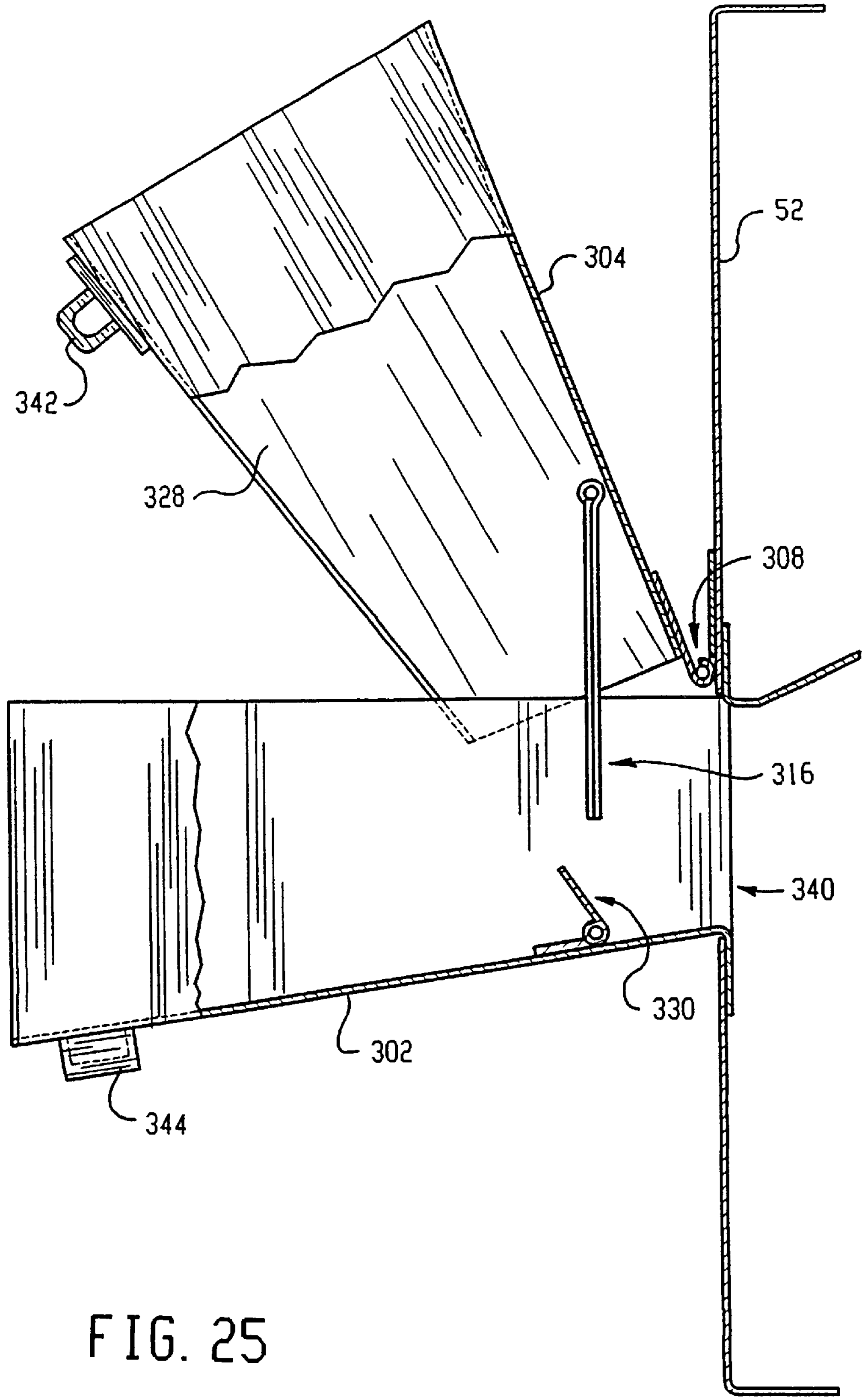
FIG. 25 is a cutaway elevation view of the safety chute of FIG. 21 with the top tray elevated.

The upper tray 304 may be retracted by lifting the output end of the upper tray around the hinge 308, as shown in FIG. 25, to provide access within the interior of the output chute 300. When the upper tray 304 is lifted upwardly, the chute guard 316, through the force of gravity, will rotate downwardly away from the upper wall 315 of the upper tray 304 to protrude substantially across the opening 340 between the cutting assembly enclosure 52 and the output chute 300 to at least partially restrict, with the secondary chute guard 330, access to the cutting assembly 24.

The lower and upper trays 302 and 304 are preferably provided with a keyed safety interlock switch embodied through the key 342 protruding from the upper tray for capture by a receptacle element 344 in the lower tray. The keyed interlock switch provides an indication to the cushioning conversion machine of whether the output chute is open or closed to be used in a logic circuit or by the machine controller 51 (FIG. 1) to prevent engagement of the cutting assembly 24 when the upper tray is not in a closed position.

Figure 26:
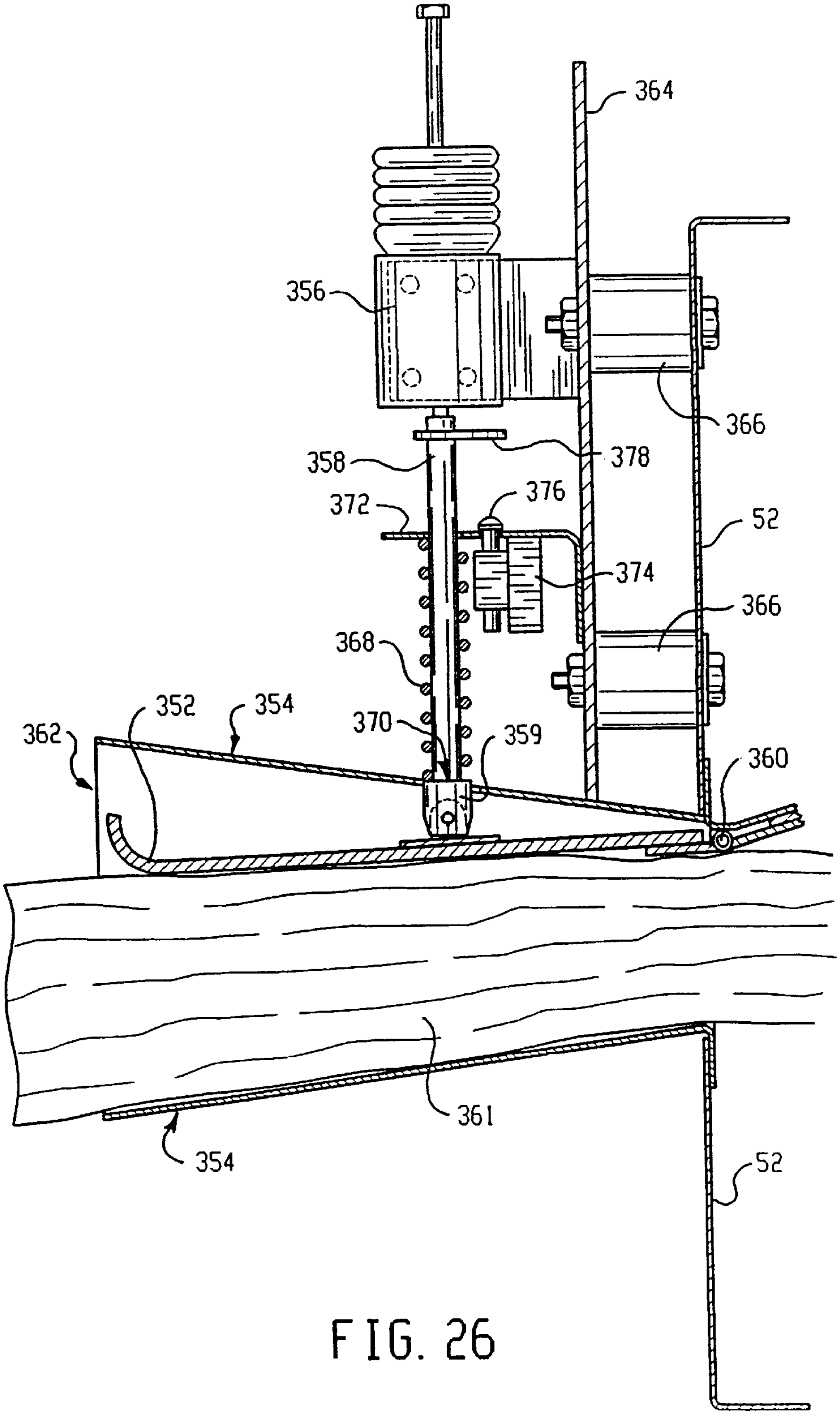
FIG. 26 is a partial cross-sectional view of a safety output chute with a powered chute guard in a closed position.
Figure 27:
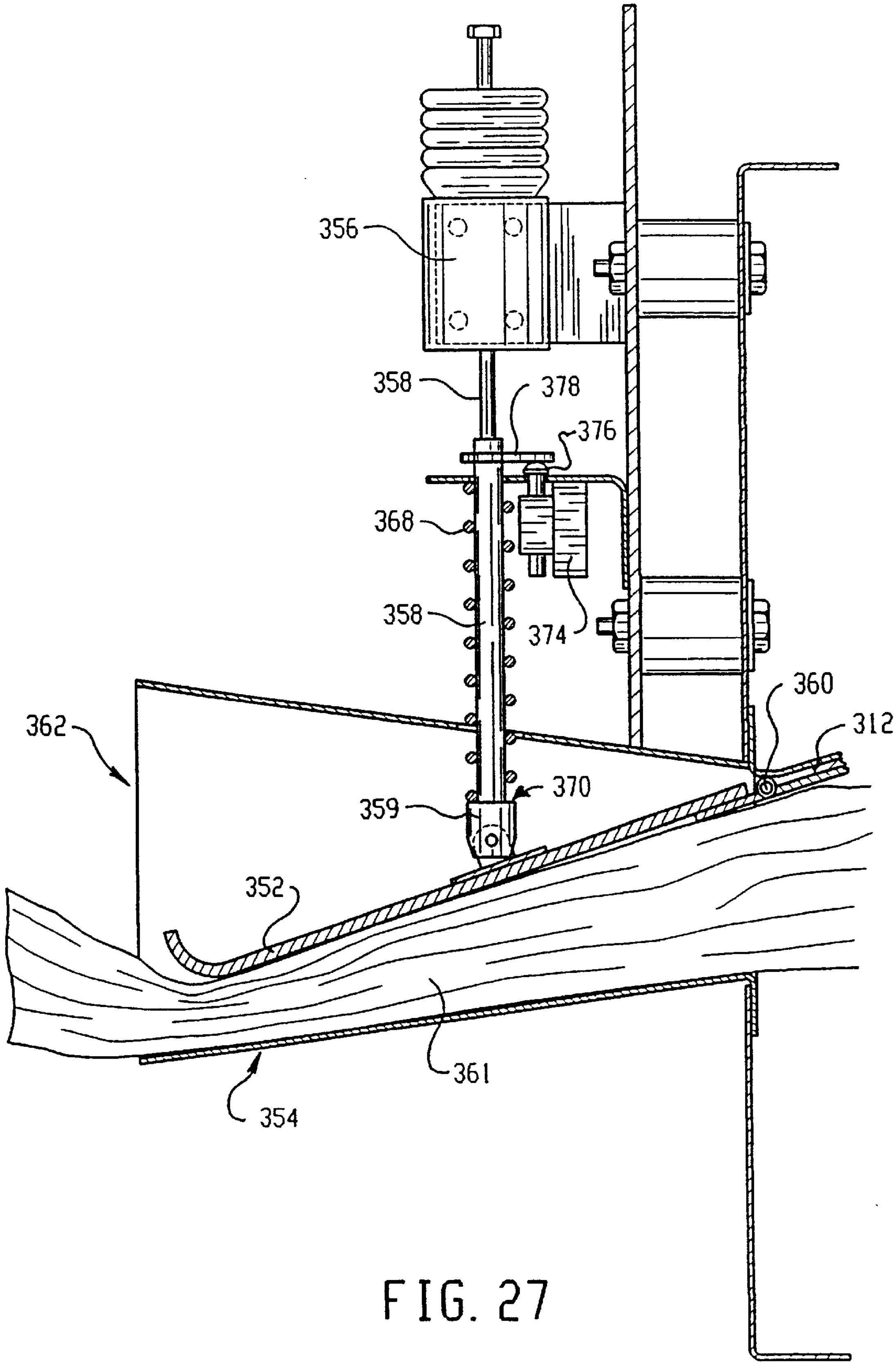
FIG. 27 is a partial cross-sectional view of the safety output chute of FIG. 26 with the powered chute guard in an open position.

Turning to FIGS. 26 and 27, there is shown a powered chute guard assembly 350. The powered chute guard assembly includes a chute guard or shield 352 disposed within a divergent output chute 354 and an actuating mechanism 356, such as a linear motor or a pneumatic, hydraulic or electric solenoid powering a rod 358 in engagement with the chute guard 352 through a rotatable connection 359. The chute guard 352 is hingedly connected at its interior end, through a hinge 360, to the deflector plate 312 secured to the cutting assembly enclosure 52 to allow it to move between an open position shown in FIG. 26 and a closed position shown in FIG. 27. In the open position, the pad 361 may progress through the output chute 354 relatively unhindered by the chute guard 352, such as when the pad 361 is being produced. In the closed position, the chute guard 352 compresses the pad 361 somewhat to prevent ingress of an object through the output chute 354 from the output end 362, such as when a pad is being severed by the cutting assembly 24.

The solenoid 356 is mounted to a mounted plate 364 spaced from the cutting assembly enclosure 52 by spacers 366 so that the rod 358 extending from the solenoid 356 connects to the chute guard 352 at a suitable distance from the hinge 360. A coiled compression spring 368 coaxial with the rod 358 and extending between a shoulder 370 of the rotatable connector 359 and the lower surface of a flange 372 biases the rod 358 and chute guard 352 downwardly to a closed position, as shown in FIG. 27. Alternatively, the spring 368 could be located elsewhere to perform the same function, such as embodied into the solenoid 356. The force of the spring 368 is preferably sufficient to compress the pad 361 to a thickness that would be less than that of a hand, while not damaging the pad, for example approximately ¾ of an inch. The spring force should also not be so strong as to cause harm to a person's hand or fingers if they were to be beneath the chute guard 352 upon being moved towards its closed position. Preferably the cutting assembly can execute a cutting cycle only when the chute guard 352 is in this closed position.

The position of the chute guard 352 is detected by a contact sensor 374 mounted to the flange 372 and having a contact 376 for contact with a finger 378 secured to the rod 358 to move axially with the rod. The sensor 374 generates a signal indicative of whether or not the contact is depressed by the finger 378 which is provided to a logic circuit or the machine controller 51 of the cushioning conversion machine for use in determining whether the machine may sever the pad 361 in the output chute.

While a pad is being produced the solenoid is energized, causing the rod 358 to retract, compressing the spring 368 and pulling the chute guard 352 upwardly into the open position, shown in FIG. 26, to allow the pad 361 to progress through the chute 354 as it is being formed. Once the pad has been formed to the desired length and a cutting operation is to be initiated, the solenoid is de-energized and the force of the spring 368 causes the rod 358 and attached chute guard 352 to move downwardly into the output chute, as shown in FIG. 27. With the chute guard fully lowered and the pad compressed, the finger 378 will depress the contact 376 and the sensor 374 will generate a signal to the cushioning conversion machine allowing a cut operation to take place.

If an obstruction has prevented the chute guard 352 from lowering fully, the finger 378 will fail to depress adequately the contact 376 and as the sensor 374 will not generate the chute closed signal, thus preventing a cutting operation from being executed.

Alternatively to the coiled compression spring 368 biasing the rod 358 and chute guard 352 to its closed position, a coiled extension spring can be secured to the flange 372 and shoulder 370 and can bias the chute guard 352 in its open position. In this case, the solenoid 356 would not be energized during a pad forming and feeding operation, but would be energized to overcome the spring bias and cause the rod 358 to extend downwardly on being energized. To perform a cutting operation, the solenoid 356 is energized and, if the chute guard 352 can be depressed sufficiently to reach its closed position, the sensor 374 will sense the finger 378 depressing the contact 376 and the cutting operation will be permitted.

Further, the solenoid 356 and rod 358 could be oriented horizontally, with the horizontal motion of the rod translated into hinged movement of the chute guard 352 through conventional methods.

Figure 28:
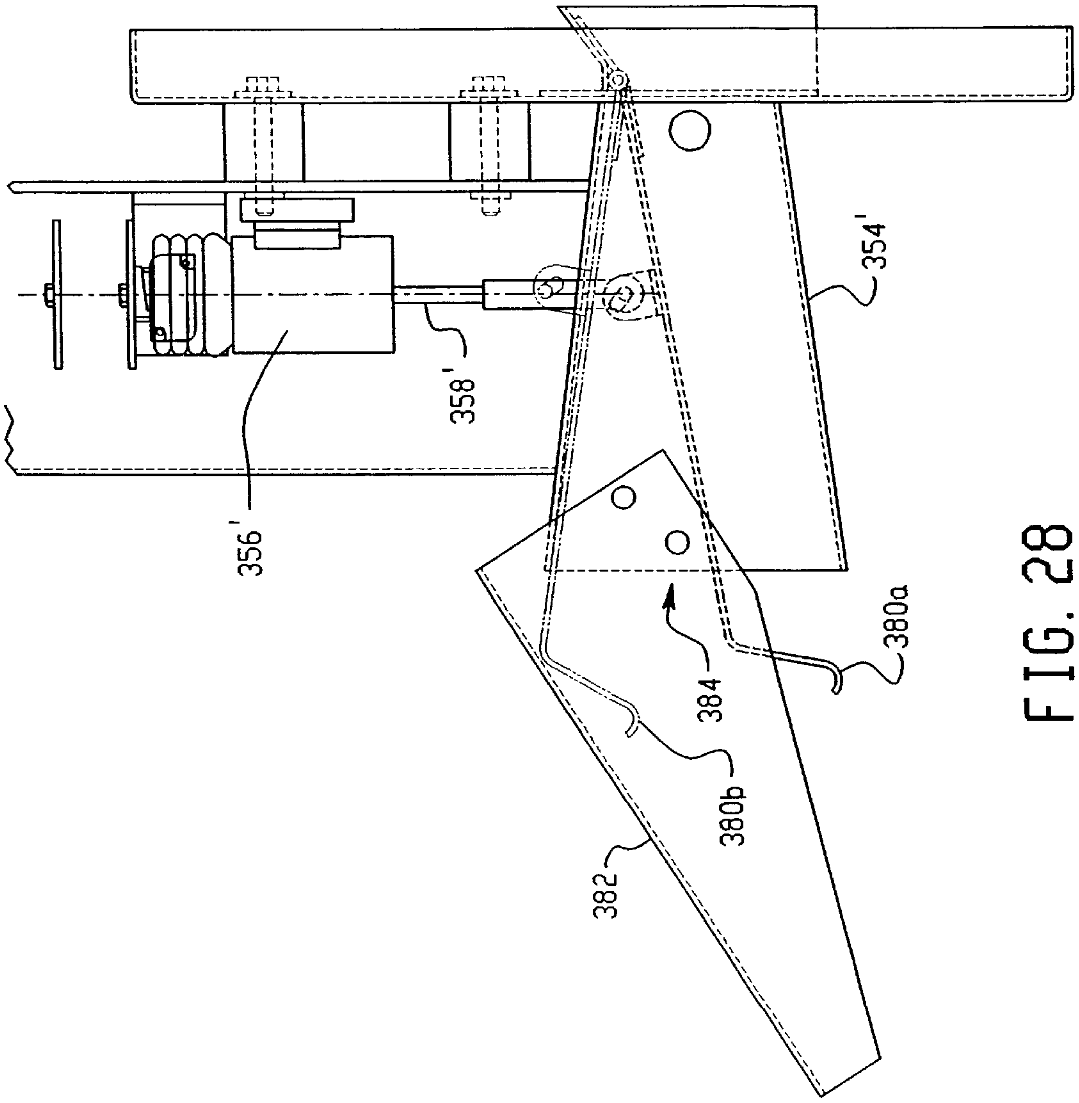
FIG. 28 is an alternate embodiment of a safety output chute with a powered chute guard.

In some applications, it may be useful to contour and extend an output chute guard 380 as shown in FIG. 28 so that a relatively smaller area of the chute guard depresses a smaller area of the pad 361 (FIG. 27), preferably outside of the output chute 354', to reduce the amount of force necessary to compress the pad sufficiently to prevent ingress of a foreign object into the chute during cutting operation. The design of the output chute 354', the solenoid 356', rod 358' and sensor may be the same or similar to the like numbered components described above relative to FIGS. 26 and 27. With the distal portion of the chute guard 380 positioned outside of the output chute 354', the pad is caused to curve downwardly about the lower distal edge 381 of the output chute when the chute guard is in its lowered or closed position 380*a*, substantially preventing ingress into the chute from below the pad. A output chute deflector 382 positioned over the output 384 of the output chute inhibits ingress into the chute above the pad. Control and actuation of the chute guard 380 between its closed 380*a* and open 380*b* positions can be accomplished similarly to that described immediately above relative to FIGS. 26 and 27, with the actuator mechanism and spring being adapted as discussed above to provide a biased closed or biased open operation.

Figure 29:
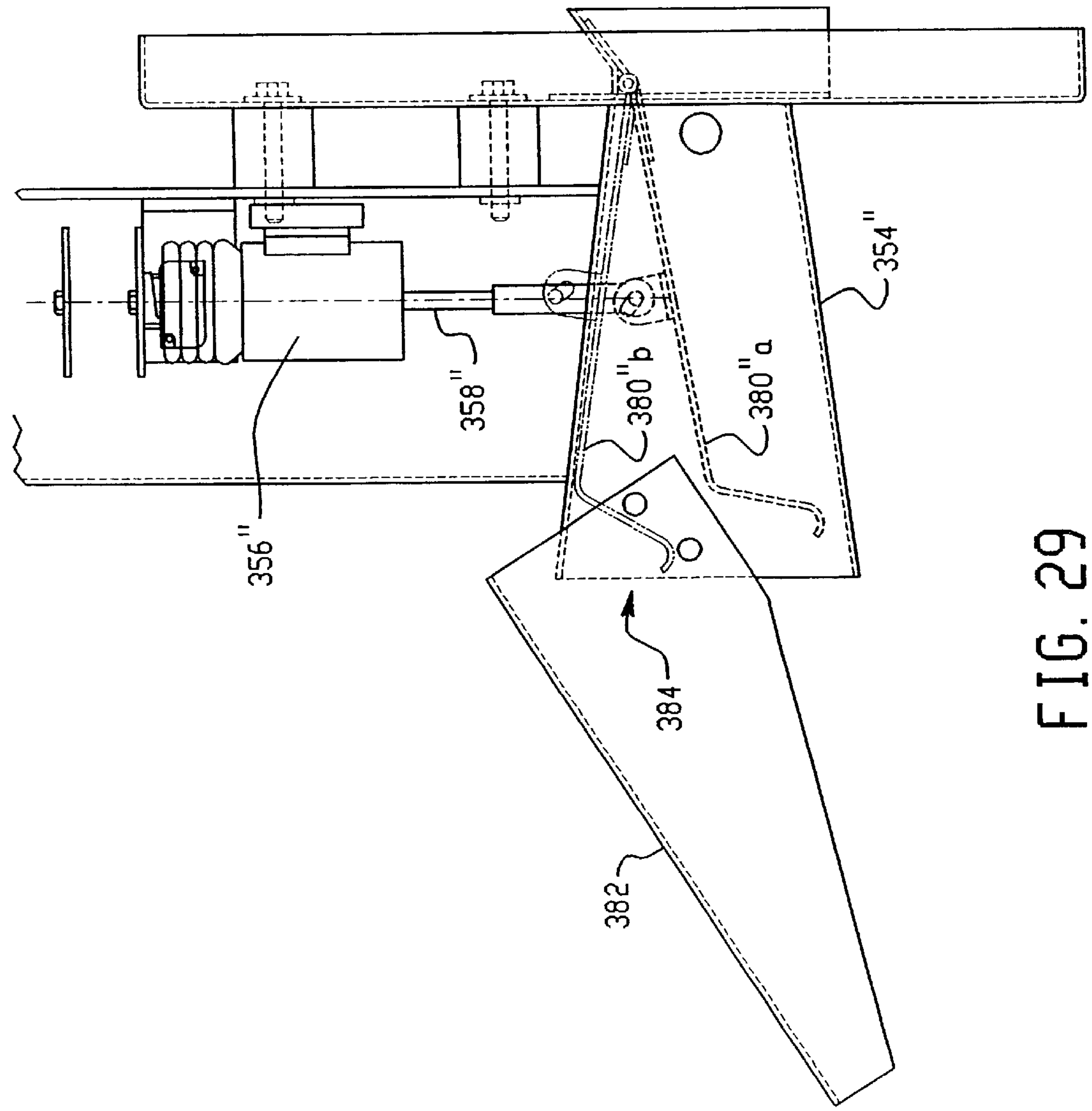
FIG. 29 is a further alternate embodiment of a safety output chute with a powered chute guard.

In FIG. 29, there is shown an embodiment of an output chute 354" with a chute guard 380" similar to that shown in FIG. 28, with the exception that the chute guard 380" is adapted to contact the pad 361 within the output chute. Preferably the output chute guard 380" contacts the pad within the output chute 354" over a small area of contact such as along a line transverse to the direction to the movement of the pad through the output chute to reduce the amount of force required to compress the pad. The chute guard 380" may thus be in the form of a generally flat plate which extends downwardly abruptly near its distal end 390 to contact the pad 361. The chute guard 380" may operate between an open position 380*a*" and a closed position 380*b*" similar to the chute guard 380 discussed above.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims. Furthermore, the corresponding structures, materials, acts, and equivalents of all means or step plus function elements in the claims below are intended to include any structure, material, or acts for performing the functions in combination with other claimed elements as specifically claimed.

What is claimed is:

1. A cushioning conversion machine for converting sheet stock material into a relatively less dense cushioning product, comprising:

a conversion assembly which converts the sheet stock material into the cushioning product and dispenses the cushioning product through an outlet;

an output chute having an input end including an opening for receiving the cushioning product from the outlet;

a shield disposed within the chute having an open position and a closed position;

an actuating mechanism connected to the shield for moving the shield between the open and closed positions; and a detector mechanism for detecting whether the shield is in an improper position indicative of the presence of an object in the chute in addition to the cushioning product.

2. The cushioning conversion machine of claim 1, wherein the detector mechanism prevents a cutting operation of the cushioning conversion machine when the shield is in the open position.

3. A cushioning conversion machine for converting sheet stock material into a relatively less dense cushioning product, comprising:

a conversion assembly which converts the sheet stock material into the cushioning product and dispenses the cushioning product through an outlet;

an output chute having an input end including an opening for receiving the cushioning product from the outlet, the chute including an openable cover; and a sliding door which blocks the opening when the cover is open and that permits passage through the opening when the cover is closed.

4. A cushioning conversion machine for converting sheet stock material into a relatively less dense cushioning product, comprising:

a conversion assembly which converts the sheet stock material into the cushioning product and dispenses the cushioning product through an outlet;

an output chute having an input end and an output end, the input end including an opening for receiving the cushioning product from the outlet; and a plurality of rows of axially spaced hinged elements substantially preventing ingress though the chute from the output end towards the input end, the hinged elements in each row being axially offset and overlapping the hinged elements in at least one other row.

5. The cushioning conversion machine of claim 4, wherein the hinged elements are offset by one-half of the axial width of a hinged element.

6. A cushioning conversion machine for converting sheet stock material into a relatively less dense cushioning product, comprising:

a conversion assembly which converts the sheet stock material into the cushioning product and dispenses the cushioning product through an outlet;

an output chute having an input end and an output end, the input end including an opening for receiving the cushioning product from the outlet; and a shield partially within the chute having an open position and a closed position, the shield extending outside the chute to contact and to deflect the cushioning product outside of the chute when the shield is in the closed position; and an actuating mechanism for moving the shield between the open and closed positions.

7. The cushioning conversion machine of claim 6, including a detector mechanism for detecting whether the shield is in an improper position indicative of the presence of an object in the chute in addition to the cushioning product.

8. The cushioning conversion machine of claim 6, wherein the detector mechanism prevents a cutting operation of the cushioning conversion machine when the shield is in the open position.

9. The cushioning conversion machine of claim 6, wherein the shield is biased in a closed position and the actuating mechanism upon being energized causes the shield to move toward an open position.

10. The cushioning conversion machine of claim 6, wherein the shield is biased in an open position and the actuating mechanism upon being energized causes the shield to move toward a closed position.

11. The cushioning conversion machine of claim 6, wherein the actuating mechanism is oriented horizontally.

12. The cushioning conversion machine of claim 6, wherein the actuating mechanism is oriented vertically.

13. The cushioning conversion machine of claim 6, wherein the cushioning product is deflected about a distal edge of the chute.

* * * * *